US011800449B2

(12) United States Patent
Yang et al.

(10) Patent No.: US 11,800,449 B2
(45) Date of Patent: Oct. 24, 2023

(54) RESOURCE ALLOCATION FOR BI-DIRECTIONAL SIDELINK WAKEUP AND PAGING

(71) Applicant: QUALCOMM Incorporated, San Diego, CA (US)

(72) Inventors: Wei Yang, San Diego, CA (US); Seyedkianoush Hosseini, San Diego, CA (US); Yuchul Kim, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 252 days.

(21) Appl. No.: 17/214,651

(22) Filed: Mar. 26, 2021

(65) Prior Publication Data

US 2022/0312320 A1    Sep. 29, 2022

(51) Int. Cl.
*H04W 52/00* (2009.01)
*H04W 52/02* (2009.01)
*H04W 76/11* (2018.01)
*H04W 72/02* (2009.01)
*H04W 72/0446* (2023.01)
(Continued)

(52) U.S. Cl.
CPC ....... *H04W 52/0229* (2013.01); *H04W 72/02* (2013.01); *H04W 72/0446* (2013.01); *H04W 72/0453* (2013.01); *H04W 76/11* (2018.02); *H04W 92/18* (2013.01)

(58) Field of Classification Search
None
See application file for complete search history.

(56) References Cited

U.S. PATENT DOCUMENTS

2020/0213976 A1\* 7/2020 Kim ..................... H04B 1/7143
2021/0058866 A1   2/2021 Hosseini
2022/0346081 A1\* 10/2022 Luo ................... H04W 52/0235

OTHER PUBLICATIONS

Intel Corporation: "Design of UE Sidelink Power Saving Solutions", 3GPP Draft, 3GPP TSG RAN WG1 Meeting #104-E, R1-2100672, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021 Jan. 19, 2021 (Jan. 19, 2021), XP051971421, 19 Pages, Retrieved from the Internet: URL: https://ftp.3gpp.org/tsg_ran/WG1_RL1/TSGR1_104-e/Docs/R1-2100672.zip R1-2100672 Intel—eV2X Power Saving.docx [retrieved on Jan. 19, 2021] Paragraph 5.5.

(Continued)

*Primary Examiner* — Abdelillah Elmejjarmi
(74) *Attorney, Agent, or Firm* — Arun Swain

(57) ABSTRACT

Methods, systems, and devices for wireless communications are described. A user equipment (UE) may identify an indication of a wakeup signal (WUS) configuration for the first UE, the WUS configuration indicating a WUS monitoring occasion for sidelink wakeup signaling between the first UE and a second UE. The UE may determine a first set of resources for transmission of a WUS by the first UE within the WUS monitoring occasion based on the WUS configuration, the first set of resources disjoint in time with a second set of resources for the second UE within the WUS monitoring occasion. The UE may transmit the WUS to the second UE using the first set of resources within the WUS monitoring occasion based on an identification of traffic for the second UE at the first UE.

30 Claims, 15 Drawing Sheets

(51) Int. Cl.
  *H04W 72/0453* (2023.01)
  *H04W 92/18* (2009.01)

(56) References Cited

OTHER PUBLICATIONS

International Search Report and Written Opinion—PCT/US2022/070697—ISA/EPO—dated Jun. 1, 2022 (2101527WO).

Lenovo, et al., "Sidelink Resource Allocation and Configuration", 3GPP Draft, 3GPP TSG RAN WG1 Meeting #89, R1-1707772, 3rd Generation Partnership Project (3GPP), Mobile Competence Centre, 650, Route Des Lucioles, F-06921 Sophia-Antipolis Cedex, France, vol. RAN WG1, No. Hangzhou, May 15, 2017-May 19, 2017 May 14, 2017 (May 14, 2017), XP051272975, 3 Pages, Retrieved from the Internet: URL: http://www.3gpp.org/ftp/Meetings_3GPP_SYNC/RAN1/Docs/ [retrieved on May 14, 2017, Paragraph 2.1.

Qualcomm Incorporated: "Hopping for -D2D Communication", 3GPP Draft, 3GPP TSG-RAN WG1 #78, R1-142956_QC_D2D_Hopping, 3rd Generation Partnership Project (3GPP), Mobile Competence Centre, 650, Route Des Lucioles, F-06921 Sophia-Antipolis Cedex, France, vol. RAN WG1, No. Dresden, Germany, Aug. 18, 2014-Aug. 22, 2014 Aug. 17, 2014 (Aug. 17, 2014), XP050788436, pp. 1-5, Retrieved from the Internet: URL: http://www.3gpp.org/ftp/Meetings_3GPP_SYNC/RAN1/Docs/ [retrieved on Aug. 17, 2014] Paragraph 2.1.

Qualcomm Incorporated: "Text Proposal for WUS Description in TS 36.304," 3GPP Draft, 3GPP TSG RAN WG2 #109-e, R2-2000307, 3rd Generation Partnership Project (3GPP), Mobile Competence Centre, 650, Route Des Lucioles, F-06921, Sophia-Antipolis Cedex, France, vol. RAN WG2. No. Feb. 24, 2020-Mar. 6, 2020, Feb. 13, 2020 (Feb. 13, 2020), XP051848525, 11 Pages, Retrieved from the Internet: URL: https://ftp.3gpp.org/tsg_ran/WG2_RL2/TSGR2_109_e/Docs/R2-2000307.zip R2-2000307 Group WUS text proposal for 36.304.docx [retrieved on Feb. 13, 2020] Section 7.x, Paragraph 7.4.

* cited by examiner

RESOURCE ALLOCATION FOR BI-DIRECTIONAL SIDELINK WAKEUP AND PAGING

FIELD OF TECHNOLOGY

The following relates to wireless communications, including resource allocation for bi-directional sidelink wakeup and paging.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may employ sidelink communications to communicate directly with another UE via sidelink, and the other UE may be outside the service area of a base station. As part of the sidelink communications, the UE may determine resources to use when sending a wakeup signal to another UE. Conventional methods for wakeup signaling in sidelink communication and related resource allocation may be deficient.

SUMMARY

The described techniques relate to improved methods, systems, devices, and apparatuses that support resource allocation for bi-directional sidelink wakeup and paging. Generally, the described techniques provide for methods for resource allocation for wakeup signaling in sidelink communications. A user equipment (UE) may identify an indication of a wakeup signal (WUS) configuration for the first UE, the wakeup signal configuration indicating a WUS monitoring occasion (e.g., a WUS monitoring occasion or a paging monitoring occasion) for sidelink wakeup signaling between the first UE and a second UE. In some cases, the UE may determine a joint index to be used for determining resources. The UE may determine a first set of resources for transmission of a WUS (e.g., a WUS or a paging signal) by the first UE within the WUS monitoring occasion based on the WUS configuration, the first set of resources disjoint in time with a second set of resources for the second UE within the WUS monitoring occasion. In some cases, this determination may be made based on the joint index. The UE may transmit the WUS to the second UE using the first set of resources within the WUS monitoring occasion based on an identification of traffic for the second UE at the first UE. In some cases, the first UE may monitor the second set of resources for a second WUS from the second UE, and may also monitor for a sidelink transmission from the second UE based on receiving the second WUS.

A method for wireless communications at a first UE is described. The method may include identifying an indication of a WUS configuration for the first UE, the WUS configuration indicating a WUS monitoring occasion for sidelink wakeup signaling between the first UE and a second UE, determining a first set of resources for transmission of a WUS by the first UE within the WUS monitoring occasion based on the WUS configuration, the first set of resources disjoint in time with a second set of resources for the second UE within the WUS monitoring occasion, and transmitting the WUS to the second UE using the first set of resources within the WUS monitoring occasion based on an identification of traffic for the second UE at the first UE.

An apparatus for wireless communications at a first UE is described. The apparatus may include a processor, memory coupled with the processor, and instructions stored in the memory. The instructions may be executable by the processor to cause the apparatus to identify an indication of a WUS configuration for the first UE, the WUS configuration indicating a WUS monitoring occasion for sidelink wakeup signaling between the first UE and a second UE, determine a first set of resources for transmission of a WUS by the first UE within the WUS monitoring occasion based on the WUS configuration, the first set of resources disjoint in time with a second set of resources for the second UE within the WUS monitoring occasion, and transmit the WUS to the second UE using the first set of resources within the WUS monitoring occasion based on an identification of traffic for the second UE at the first UE.

Another apparatus for wireless communications at a first UE is described. The apparatus may include means for identifying an indication of a WUS configuration for the first UE, the WUS configuration indicating a WUS monitoring occasion for sidelink wakeup signaling between the first UE and a second UE, means for determining a first set of resources for transmission of a WUS by the first UE within the WUS monitoring occasion based on the WUS configuration, the first set of resources disjoint in time with a second set of resources for the second UE within the WUS monitoring occasion, and means for transmitting the WUS to the second UE using the first set of resources within the WUS monitoring occasion based on an identification of traffic for the second UE at the first UE.

A non-transitory computer-readable medium storing code for wireless communications at a first UE is described. The code may include instructions executable by a processor to identify an indication of a WUS configuration for the first UE, the WUS configuration indicating a WUS monitoring occasion for sidelink wakeup signaling between the first UE and a second UE, determine a first set of resources for transmission of a WUS by the first UE within the WUS monitoring occasion based on the WUS configuration, the first set of resources disjoint in time with a second set of resources for the second UE within the WUS monitoring occasion, and transmit the WUS to the second UE using the first set of resources within the WUS monitoring occasion based on an identification of traffic for the second UE at the first UE.

Some examples of the method, apparatuses, and non-transitory computer-readable medium described herein may further include operations, features, means, or instructions for determining a joint index for the first UE and the second UE.

Some examples of the method, apparatuses, and non-transitory computer-readable medium described herein may further include operations, features, means, or instructions for determining the first set of resources based on the joint index and determining the second set of resources for the second UE based on the joint index.

In some examples of the method, apparatuses, and non-transitory computer-readable medium described herein, the joint index may be indicated in the WUS configuration.

Some examples of the method, apparatuses, and non-transitory computer-readable medium described herein may further include operations, features, means, or instructions for determining a number of time resources and a number of frequency resources of the WUS monitoring occasion, where the first set of resources may be determined based on the number of time resources and the number of frequency resources of the WUS monitoring occasion.

Some examples of the method, apparatuses, and non-transitory computer-readable medium described herein may further include operations, features, means, or instructions for determining the first set of resources based on an identifier of the first UE and the joint index for the first UE and the second UE.

Some examples of the method, apparatuses, and non-transitory computer-readable medium described herein may further include operations, features, means, or instructions for determining a coordination rule between the first UE and the second UE, where the first set of resources may be determined in accordance with the coordination rule, where the coordination rule indicates the first set of resources or the second set of resources based on a comparison of identifiers associated with the first UE and the second UE.

Some examples of the method, apparatuses, and non-transitory computer-readable medium described herein may further include operations, features, means, or instructions for determining a hopping pattern for a sidelink control channel between the first UE and the second UE, where the first set of resources may be determined based on the hopping pattern.

In some examples of the method, apparatuses, and non-transitory computer-readable medium described herein, the WUS monitoring occasion includes two time-domain resource units and the method, apparatuses, and non-transitory computer-readable medium may include further operations, features, means, or instructions for determining the first set of resources to be a first time-domain resource of the two time-domain resource units based on an identifier of the first UE, the first time-domain resource corresponding to one of an odd time index value or an even time index value.

Some examples of the method, apparatuses, and non-transitory computer-readable medium described herein may further include operations, features, means, or instructions for monitoring the second set of resources for a second WUS from the second UE based on the WUS configuration.

Some examples of the method, apparatuses, and non-transitory computer-readable medium described herein may further include operations, features, means, or instructions for receiving the second WUS from the second UE based on the monitoring and monitoring for a sidelink transmission from the second UE based on receiving the second wakeup signal.

In some examples of the method, apparatuses, and non-transitory computer-readable medium described herein, identifying the indication of the WUS configuration may include operations, features, means, or instructions for receiving the indication of the WUS configuration from the second UE or from a base station.

A method for wireless communications at a first UE is described. The method may include identifying an indication of a WUS configuration for the first UE, the WUS configuration indicating a WUS monitoring occasion for sidelink wakeup signaling between the first UE and a second UE, determining a first set of resources for transmission of a WUS by the first UE within the WUS monitoring occasion based on the WUS configuration, the first set of resources disjoint in time with a second set of resources for the second UE within the WUS monitoring occasion, and transmitting the WUS to the second UE using the first set of resources within the WUS monitoring occasion based on an identification of traffic for the second UE at the first UE.

An apparatus for wireless communications at a first UE is described. The apparatus may include a processor, memory coupled with the processor, and instructions stored in the memory. The instructions may be executable by the processor to cause the apparatus to identify an indication of a WUS configuration for the first UE, the WUS configuration indicating a WUS monitoring occasion for sidelink wakeup signaling between the first UE and a second UE, determine a first set of resources for transmission of a WUS by the first UE within the WUS monitoring occasion based on the WUS configuration, the first set of resources disjoint in time with a second set of resources for the second UE within the WUS monitoring occasion, and transmit the WUS to the second UE using the first set of resources within the WUS monitoring occasion based on an identification of traffic for the second UE at the first UE.

Another apparatus for wireless communications at a first UE is described. The apparatus may include means for identifying an indication of a WUS configuration for the first UE, the WUS configuration indicating a WUS monitoring occasion for sidelink wakeup signaling between the first UE and a second UE, means for determining a first set of resources for transmission of a WUS by the first UE within the WUS monitoring occasion based on the WUS configuration, the first set of resources disjoint in time with a second set of resources for the second UE within the WUS monitoring occasion, and means for transmitting the WUS to the second UE using the first set of resources within the WUS monitoring occasion based on an identification of traffic for the second UE at the first UE.

A non-transitory computer-readable medium storing code for wireless communications at a first UE is described. The code may include instructions executable by a processor to identify an indication of a WUS configuration for the first UE, the WUS configuration indicating a WUS monitoring occasion for sidelink wakeup signaling between the first UE and a second UE, determine a first set of resources for transmission of a WUS by the first UE within the WUS monitoring occasion based on the WUS configuration, the first set of resources disjoint in time with a second set of resources for the second UE within the WUS monitoring occasion, and transmit the WUS to the second UE using the first set of resources within the WUS monitoring occasion based on an identification of traffic for the second UE at the first UE.

Some examples of the method, apparatuses, and non-transitory computer-readable medium described herein may further include operations, features, means, or instructions for determining a joint index for the first UE and the second UE.

Some examples of the method, apparatuses, and non-transitory computer-readable medium described herein may further include operations, features, means, or instructions for determining the first set of resources based on the joint index and determine the second set of resources for the second UE based on the joint index.

In some examples of the method, apparatuses, and non-transitory computer-readable medium described herein, the joint index may be indicated in the WUS configuration.

Some examples of the method, apparatuses, and non-transitory computer-readable medium described herein may further include operations, features, means, or instructions for determining a number of time resources and a number of frequency resources of the WUS monitoring occasion, where the first set of resources may be determined based on the number of time resources and the number of frequency resources of the WUS monitoring occasion.

Some examples of the method, apparatuses, and non-transitory computer-readable medium described herein may further include operations, features, means, or instructions for determining the first set of resources based on an identifier of the first UE and the joint index for the first UE and the second UE.

Some examples of the method, apparatuses, and non-transitory computer-readable medium described herein may further include operations, features, means, or instructions for determining a coordination rule between the first UE and the second UE, where the first set of resources may be determined in accordance with the coordination rule, where the coordination rule indicates the first set of resources or the second set of resources based on a comparison of identifiers associated with the first UE and the second UE.

Some examples of the method, apparatuses, and non-transitory computer-readable medium described herein may further include operations, features, means, or instructions for determining a hopping pattern for a sidelink control channel between the first UE and the second UE, where the first set of resources may be determined based on the hopping pattern.

In some examples of the method, apparatuses, and non-transitory computer-readable medium described herein, the WUS monitoring occasion includes two time-domain resource units and the method, apparatuses, and non-transitory computer-readable medium may include further operations, features, means, or instructions for determining the first set of resources to be a first time-domain resource of the two time-domain resource units based on an identifier of the first UE, the first time-domain resource corresponding to one of an odd time index value or an even time index value.

Some examples of the method, apparatuses, and non-transitory computer-readable medium described herein may further include operations, features, means, or instructions for monitoring the second set of resources for a second WUS from the second UE based on the WUS configuration.

Some examples of the method, apparatuses, and non-transitory computer-readable medium described herein may further include operations, features, means, or instructions for receiving the second WUS from the second UE based on the monitoring and monitor for a sidelink transmission from the second UE based on receiving the second wakeup signal.

In some examples of the method, apparatuses, and non-transitory computer-readable medium described herein, identifying the indication of the WUS configuration may include operations, features, means, or instructions for receiving the indication of the WUS configuration from the second UE or from a base station.

A method for wireless communications at a first UE is described. The method may include identifying an indication of a WUS configuration for the first UE, the WUS configuration indicating a WUS monitoring occasion for sidelink wakeup signaling between the first UE and a second UE, determining a first set of resources for transmission of a WUS by the first UE within the WUS monitoring occasion based on the WUS configuration, the first set of resources disjoint in time with a second set of resources for the second UE within the WUS monitoring occasion, and transmitting the WUS to the second UE using the first set of resources within the WUS monitoring occasion based on an identification of traffic for the second UE at the first UE.

An apparatus for wireless communications at a first UE is described. The apparatus may include a processor, memory coupled with the processor, and instructions stored in the memory. The instructions may be executable by the processor to cause the apparatus to identify an indication of a WUS configuration for the first UE, the WUS configuration indicating a WUS monitoring occasion for sidelink wakeup signaling between the first UE and a second UE, determine a first set of resources for transmission of a WUS by the first UE within the WUS monitoring occasion based on the WUS configuration, the first set of resources disjoint in time with a second set of resources for the second UE within the WUS monitoring occasion, and transmit the WUS to the second UE using the first set of resources within the WUS monitoring occasion based on an identification of traffic for the second UE at the first UE.

Another apparatus for wireless communications at a first UE is described. The apparatus may include means for identifying an indication of a WUS configuration for the first UE, the WUS configuration indicating a WUS monitoring occasion for sidelink wakeup signaling between the first UE and a second UE, means for determining a first set of resources for transmission of a WUS by the first UE within the WUS monitoring occasion based on the WUS configuration, the first set of resources disjoint in time with a second set of resources for the second UE within the WUS monitoring occasion, and means for transmitting the WUS to the second UE using the first set of resources within the WUS monitoring occasion based on an identification of traffic for the second UE at the first UE.

A non-transitory computer-readable medium storing code for wireless communications at a first UE is described. The code may include instructions executable by a processor to identify an indication of a WUS configuration for the first UE, the WUS configuration indicating a WUS monitoring occasion for sidelink wakeup signaling between the first UE and a second UE, determine a first set of resources for transmission of a WUS by the first UE within the WUS monitoring occasion based on the WUS configuration, the first set of resources disjoint in time with a second set of resources for the second UE within the WUS monitoring occasion, and transmit the WUS to the second UE using the first set of resources within the WUS monitoring occasion based on an identification of traffic for the second UE at the first UE.

Some examples of the method, apparatuses, and non-transitory computer-readable medium described herein may further include operations, features, means, or instructions for determining a joint index for the first UE and the second UE.

Some examples of the method, apparatuses, and non-transitory computer-readable medium described herein may further include operations, features, means, or instructions for determining the first set of resources based on the joint index and determine the second set of resources for the second UE based on the joint index.

DETAILED DESCRIPTION

Figure 1:
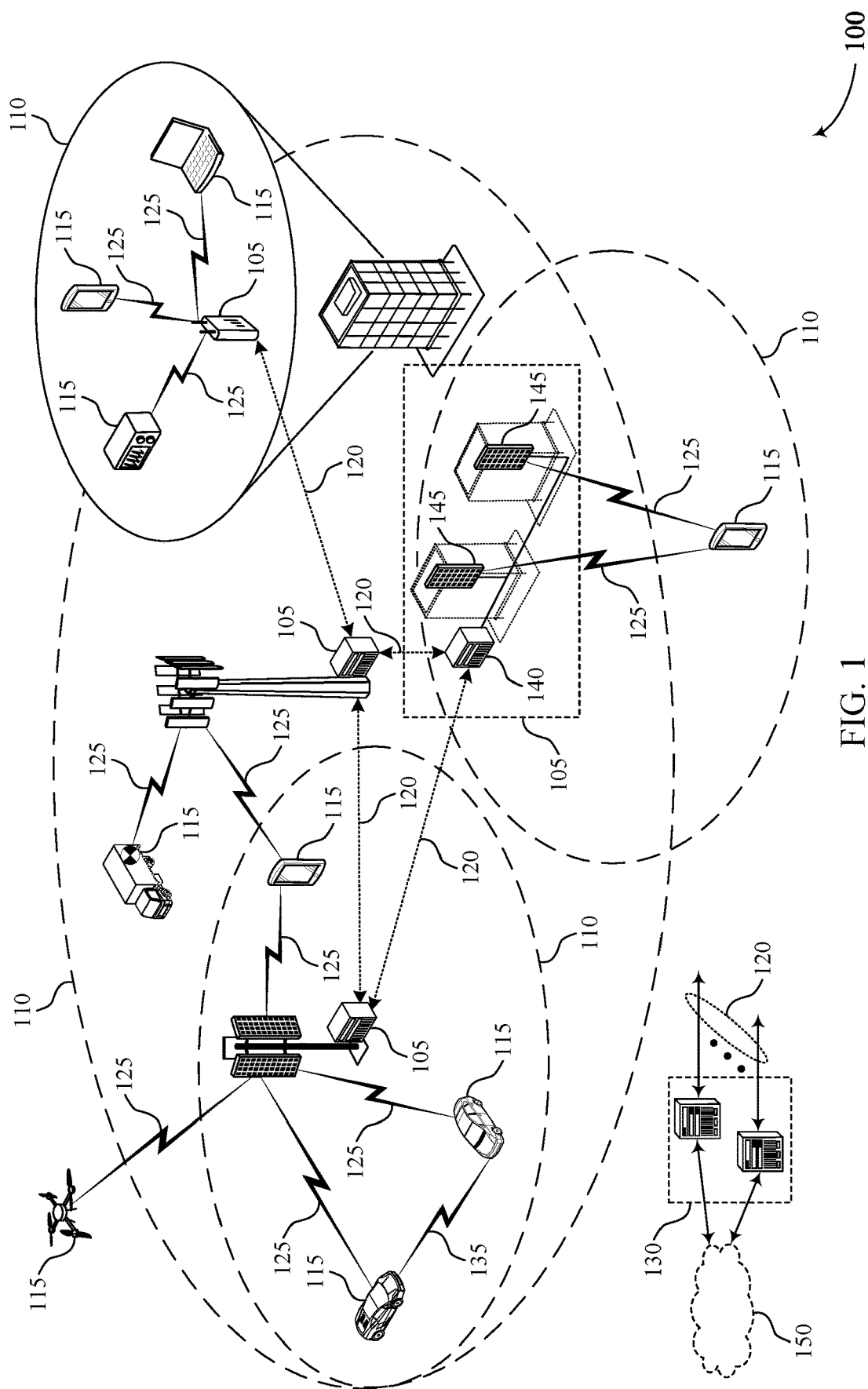
FIG. 1 illustrates an example of a wireless communications system that supports resource allocation for bi-directional sidelink wakeup and paging in accordance with aspects of the present disclosure.

In some wireless communications, devices send and receive signals, but continuous monitoring at the receiving device for incoming signals would consume power. To conserve power, a device may periodically monitor to detect a wakeup signal (WUS) rather than continuously monitoring for signaling, which may save power. This WUS may be used to notify the device to prepare reception of a downlink signal, such as a data or control signal.

A WUS may also be used in sidelink communications, in which a UE may communicate with another UE. In such a scenario, the UEs may also perform periodic monitoring for a WUS to save power. In the process of communicating via sidelink, a UE may send a WUS to notify another UE to prepare reception of a signal, such as a data or control signal. In some cases, each UE may send a respective WUS to the other UE over the same time period (or overlapping time period), which may result in neither UE receiving the WUS (e.g., in cases where either or both UEs are operating in a half-duplex mode in which simultaneous transmission and reception by a UE is not permitted).

To increase WUS reliability, a resource allocation scheme that enables each UE to both transmit and receive WUSs via sidelink communication without collisions or interference due to simultaneous use of resources may be used. The resource allocation scheme may define non-overlapping time resources to be used within a WUS monitoring occasion, in which each UE may utilize a portion of the resources without interfering or overlapping with the time resources of the other UE. In some examples, the resource allocation scheme may establish a joint index defined by one or more parameters, such as identifiers associated with the UEs.

In some examples, the resource allocation scheme may be derived through the use of a Latin square approach to avoid overlapping in both time resources and frequency resources. In this way, each UE may utilize given time resources and frequency resources in which a given UE may transmit a WUS to the another UE as part of sidelink communications. Such techniques may reduce or prevent the situation where both UEs try to transmit a WUS over the same time period and neither WUS is received (e.g., in examples where either or both UEs are operating in a half-duplex mode). In some examples, rules may be specified as to which resources of the resource allocation scheme are assigned to each UE. Such techniques may be applicable for bi-directional paging in which a bi-direction paging channel is used and as such, all descriptions herein related to a WUS may be similarly applicable for paging. Further, a WUS may also be referred to as or interchanged with a paging channel or paging signal.

Aspects of the disclosure are initially described in the context of wireless communications systems. Aspects of the disclosure are then illustrated by timing diagrams, resource allocation schemes, and process flows. Aspects of the disclosure are further illustrated by and described with reference to apparatus diagrams, system diagrams, and flowcharts that relate to resource allocation for bi-directional sidelink wakeup and paging.

FIG. 1 illustrates an example of a wireless communications system 100 that supports techniques for bi-directional wakeup signals in sidelink transmission in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A first UE 115 may identify an indication of a WUS configuration for the first UE 115, the WUS configuration indicating a WUS monitoring occasion (e.g., a WUS monitoring occasion or a paging monitoring occasion) for sidelink wakeup signaling between the first UE 115 and a second UE. In some cases, the first UE 115 may determine a joint index to be used for determining resources. The first UE 115 may determine a first set of resources for transmission of a WUS (e.g., a WUS or a paging signal) by the first UE 115 within the WUS monitoring occasion based on the WUS configuration, the first set of resources disjoint in time with a second set of resources for the second UE within the WUS monitoring occasion. In some cases, the first UE 115 may make this determination based on the joint index. The first UE 115 may transmit the WUS to the second UE using the first set of resources within the WUS monitoring occasion based on an identification of traffic for the second UE at the first UE 115. In some cases, the first UE 115 may monitor the second set of resources for a second WUS from the second UE, and may also monitor for a sidelink transmission from the second UE based on receiving the second WUS. As such, the first UE 115 and second UE may transmit WUSs in sidelink communication over non-overlapping resources.

Figure 2:
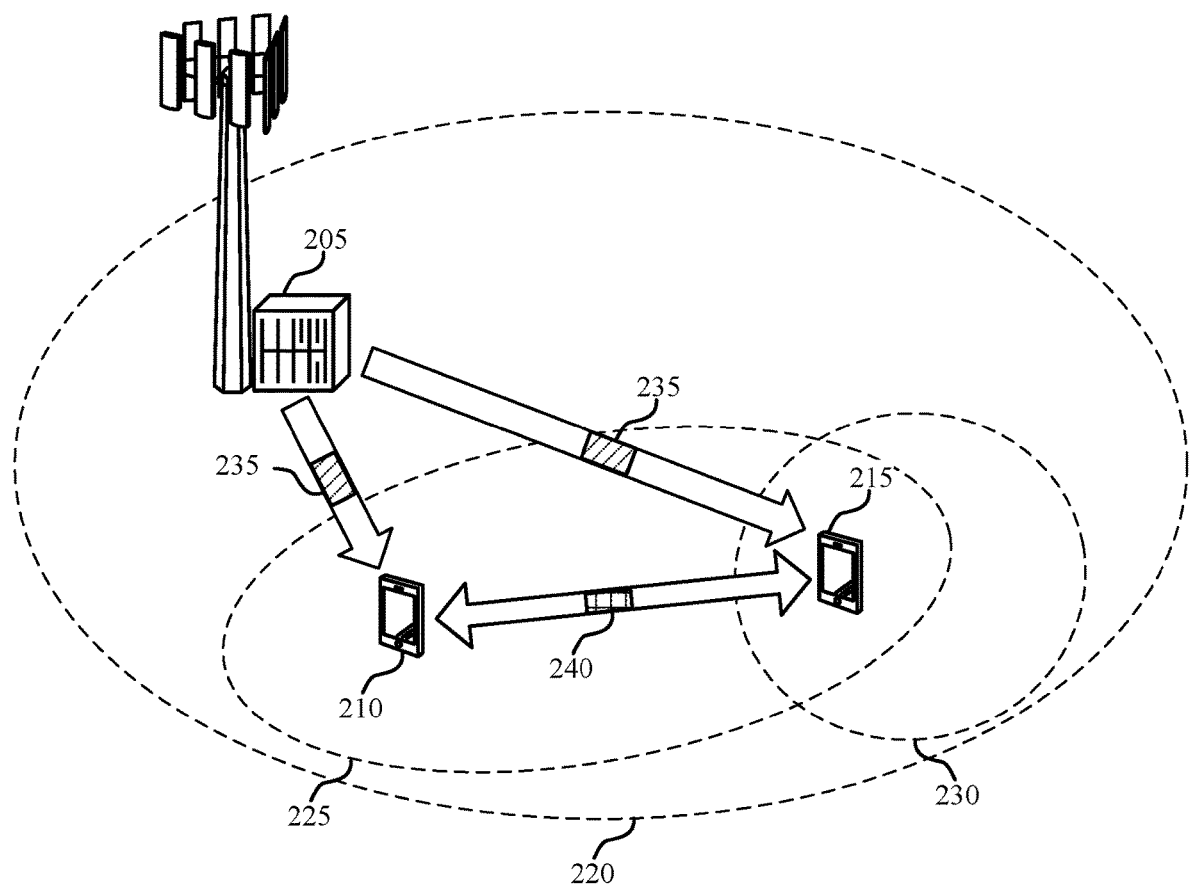
FIG. 2 illustrates an example of a wireless communication system that supports techniques for resource allocation for bi-directional sidelink wakeup and paging in accordance with aspects of the present disclosure.

FIG. 2 illustrates an example of a wireless communication system 200 that supports techniques for bi-directional wake up signals in sidelink transmission. The wireless communications system 200 may include base station 205, first UE 210, and second UE 215, each of which may be an example of the corresponding devices as described herein. Base station 205 may serve a geographic coverage area 220. In some examples, the first UE 210 and the second UE 215 may be within the geographic coverage area 220, the first UE 210 may serve a first sidelink coverage area 225, and second UE 215 may serve a second sidelink coverage area 230. The first sidelink coverage area 225 and the second sidelink coverage area 230 may overlap, and first UE 210 and second UE 215 may be in sidelink communication with each other. In some sidelink communications, the first UE 210 and the second UE 215 may communicate directly with one another without involvement or communications via the base station 205.

In some examples, and as depicted in FIG. 2, the first UE 210 and the second UE 215 may be within the geographic coverage area 220 of the base station 205. In such cases, the base station 205 may send a WUS resource configuration 235 to both the first UE 210 and the second UE 215. In other examples, only one of the first UE 210 and the second UE 215 may be within the geographic coverage area 220, while the other may be outside of the geographic coverage area 220. In such examples, the base station 205 may send the WUS resource configuration 235 to the UE within the geographic coverage area 220, and the UE may then forward the WUS resource configuration to the other UE that is not in the geographic coverage area 220.

The WUS resource configuration 235 may include settings, parameters, rules, configurations, or other information that may enable the first UE 210 and second UE 215 to determine resources for bi-directional sidelink WUS transmissions. In some embodiments, a joint index may be included in the WUS resource configuration 235. In some examples, the joint index may be determined based upon one or more factors. The one or more factors may include various characteristics, identifiers, configurations, settings, rules, procedures, or other information. In some examples, the one or more factors may include identifiers (IDs) of the first UE 210, the second UE 215, or both.

In some examples, the first UE 210 and the second UE 215 may each determine resources to use to transmit a WUS (e.g., WUS 240 as depicted in FIG. 2) to the other. Such determinations may be based on the settings, parameters, rules, configurations, or information included in the configuration (e.g., the joint index). The determinations may also be based on rules, procedures, or configurations already known to the first UE 210 and the second UE 215 based on a pre-configuration of the first UE 210 or the second UE 215. In some cases, the resources determined by the first UE 210 may include time-frequency resources that do not overlap with the resources determined by the second UE 215 in time, frequency, or both. Such non-overlapping resources may enable the first UE 210 to transmit a WUS 240 to the second UE 215 during a first time, and monitor for a WUS 240 from the second UE 215 during a second time rather than both of first UE 210 and second UE 215 using the same resources for transmission of WUS 240. This may result in a higher likelihood of successful reception and transmission of the WUS 240 from both first UE 210 and second UE 215.

In some examples, once the first UE 210 and the second UE 215 have received the WUS resource configuration 235 and determined the resources that each will use to transmit a WUS 240 to the other UE, one of the first UE 210 or the second UE 215 may be send a WUS 240 using the determined respective resources. For example, first UE 210 may have data to send to the second UE 215 via sidelink and may then send a WUS 240 using the determined resources in accordance with the WUS resource configuration 235. The second UE 215 may monitor the resources used by the first UE 210 for transmission of the WUS based on the WUS resource configuration 235, and may receive the WUS 240 from the first UE 210. After receiving the WUS 240, the second UE 215 may wake up and monitor for control information, data, or other messaging from the first UE 210.

Figure 3A:
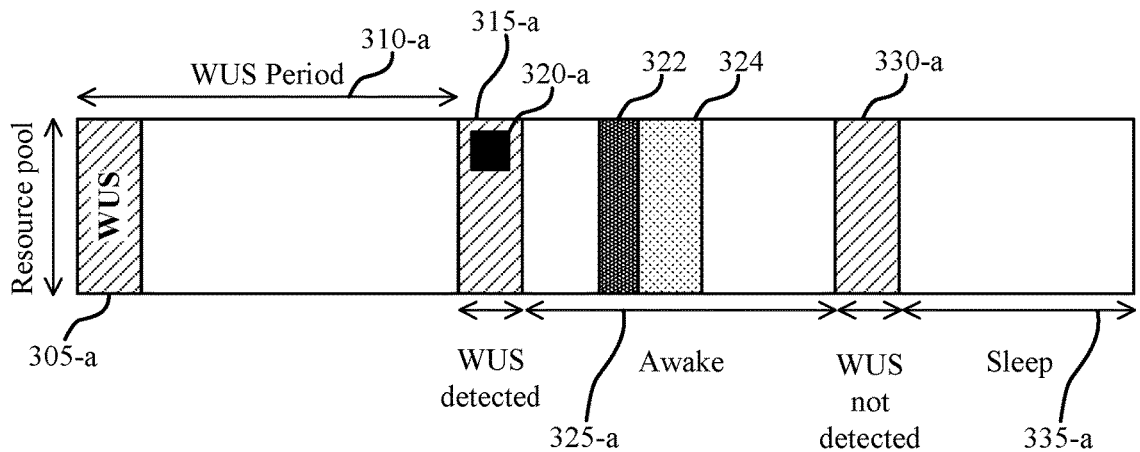
FIGS. 3A, 3B, and 3C illustrate examples of timing diagrams that support techniques for resource allocation for bi-directional sidelink wakeup and paging in accordance with aspects of the present disclosure.
Figure 3B:
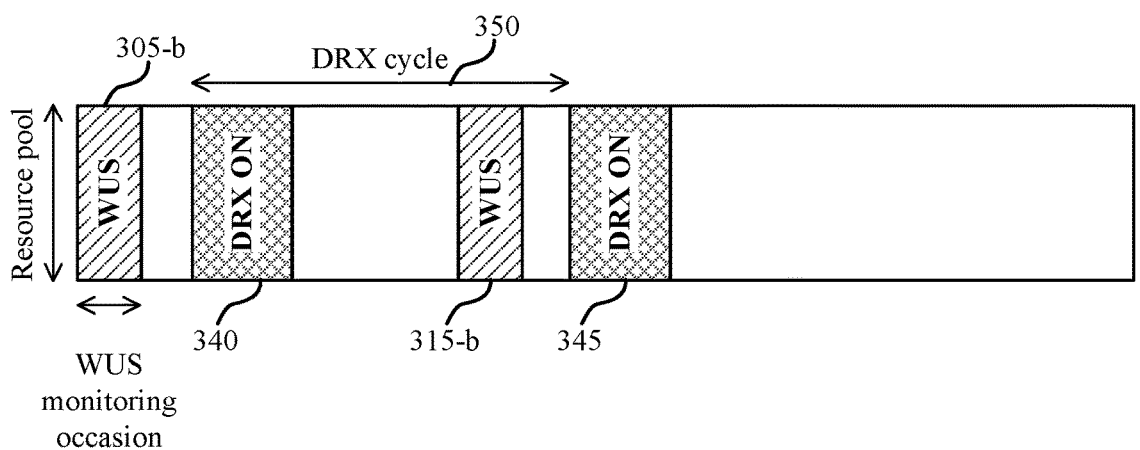
Figure 3C:
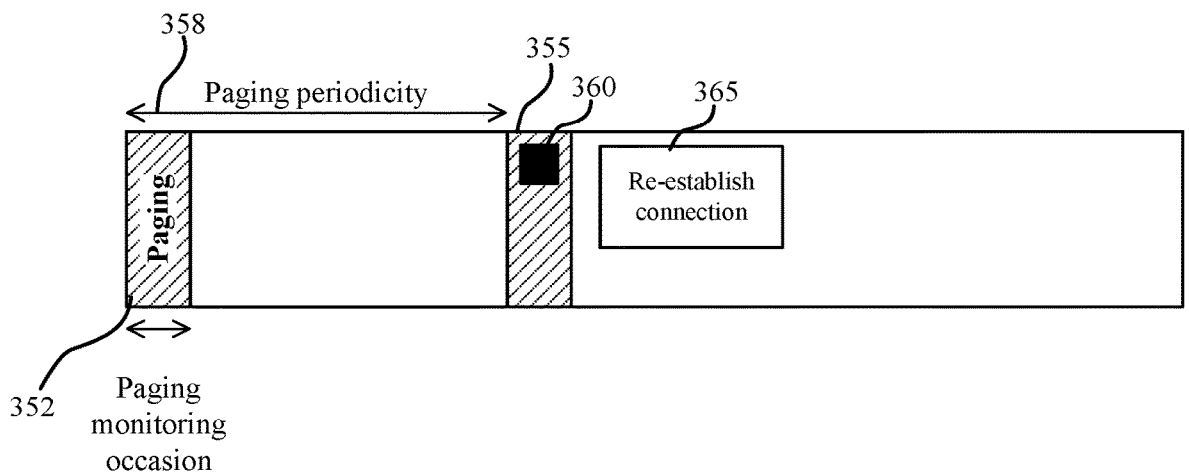

FIGS. 3A, 3B, and 3C illustrate examples of timing diagrams illustrating monitoring occasions for WUSs, discontinuous reception (DRX), and paging signals as used in the techniques described herein. In these examples, both WUSs and paging signals are depicted, and although not all alternatives are depicted in every example, it should be understood that techniques described herein related to WUSs may also be applied to the use of paging signals.

FIG. 3A depicts WUS monitoring occasions, WUS periods, and various states, each of which may be associated with WUSs and the techniques described herein. The horizontal axis depicts time progressing forwards towards the right of the figure, and the vertical axis depicts an available resource pool in the frequency domain.

At first WUS monitoring occasion 305-a, a UE (e.g., first UE 210 or second UE 215 as described in FIG. 2) may monitor for a WUS sent from another device (e.g., another UE attempting to communicate via sidelink communication over resources determined as described herein). Once the first WUS monitoring occasion 305-a ends, the UE may discontinue monitoring for WUS for a time until the next monitoring occasion. The UE may begin and end monitoring occasions periodically according to a period, such as WUS period 310-a. In some examples, the UE may monitor resources determined by the UE in the first WUS monitoring occasion 305-a that correspond to resources used by another UE (e.g., a sidelink UE in communication with the UE) for transmission of a WUS, as described herein. In this example, in the first WUS monitoring occasion 305-a, the UE may not detect any signal, as there is no WUS transmitted for the UE to detect. In such cases, the UE may remain in the sleep state (e.g., the UE may refrain from monitoring for any control, data, or other communications, may turn off one or more components, or the like) until the second WUS monitoring occasion 315-a.

At second WUS monitoring occasion 315-a, a WUS 320-a may be received by the UE. WUS 320-a may be an example of WUS 240 described with reference to FIG. 2. WUS 320-a may be transmitted by another device over resources determined based on a configuration, such as WUS resource configuration 235 described with respect to FIG. 2. In response to the WUS 320-a being detected, the UE that received the WUS 320-a may enter into an awake state 325-a for the remainder of the WUS period following the second WUS monitoring occasion 315-a. During the awake state 325-a, the UE may be actively monitoring or available to receive other transmissions, such as configuration transmissions, data transmissions, or other transmissions from the device that sent the WUS 320-a. In some cases, the UE may receive control information (e.g., sidelink control information (SCI) 322), sidelink data 324, or both during the awake state 325-a. In some examples, the UE may monitor resources determined by the UE in the second WUS monitoring occasion 315-a that correspond to resources used by another UE (e.g., a sidelink UE in communication with the UE) for transmission of a WUS, as described herein.

Once the awake state 325-a and the corresponding WUS period ends, the UE then monitors the third WUS monitoring occasion 330-a. In the third WUS monitoring occasion 330-a, the UE monitors for a WUS signal, and in this example, no WUS is detected during the third WUS monitoring occasion 330-a. As a result, the UE may then enter a sleep period 335-a for the remainder of the corresponding WUS period.

FIG. 3B depicts WUS monitoring occasions, which may be examples of those described with respect to FIG. 3A. FIG. 3A also includes a DRX procedure. The horizontal axis depicts time progressing forwards towards the right of the figure, and the vertical axis depicts an available resource pool in the frequency domain.

At first WUS monitoring occasion 305-b and second WUS monitoring occasion 315-b, the UE monitors for a WUS, similar to the first WUS monitoring occasion 305-a and the second WUS monitoring occasion 315-a described herein. In some examples, the UE may monitor resources determined by the UE in the first WUS monitoring occasion 305-b that correspond to resources used by another UE (e.g., a sidelink UE in communication with the UE) for transmission of a WUS, as described herein. Optionally, the UE may be configured for DRX and may monitor during DRX monitoring occasion 340 and DRX monitoring occasion 345, in accordance with a DRX cycle 350. During such occasions, the UE may monitor for a WUS, a paging signal, or other transmission for the UE. For example, the UE may monitor a physical downlink control channel (PDCCH) during DRX monitoring occasion 340 to determine whether data will be sent to the UE via a physical downlink shared channel (PDCSH). In some embodiments, DRX monitoring occasion 340, DRX monitoring occasion 345, and DRX cycle 350 may be associated with a paging operation.

FIG. 3C depicts a timing diagram associated with paging operations. The horizontal axis depicts time progressing forwards towards the right of the figure, and the vertical axis depicts an available resource pool in the frequency domain.

In some examples, the techniques described herein may also be utilized with paging operations. In some aspects, the paging operations may operate on longer periods or cycles than those of WUSs.

At a first paging monitoring occasion 352, the UE may monitor one or more resources for a paging signal, after which the UE may end monitoring for a time until beginning a second paging monitoring occasion 355. In some examples, the UE may monitor resources determined by the UE in the first paging monitoring occasion 352 that correspond to resources used by another UE (e.g., a sidelink UE in communication with the UE) for transmission of a paging signal, as described herein. The UE may regularly begin and end paging monitoring occasions and may establish a paging periodicity 358. At first paging monitoring occasion 352, the UE may not detect a paging signal. However, at second paging monitoring occasion 355, the UE may detect a paging signal 360. Upon detecting the paging signal 360, the UE may re-establish a connection with another device at 365. For example, as a result of detecting the paging signal 360, the UE may re-establish a PC5 connection or other sidelink connection with another UE. Alternatively, or additionally, as a result of receiving the paging signal 360, the UE may then re-establish a sidelink connection with another UE (such as the second UE 215 described in relation to FIG. 2). Such paging signals may be transmitted and received over various resources determined using techniques described herein that enable bi-directional sidelink paging transmission.

Figure 4:
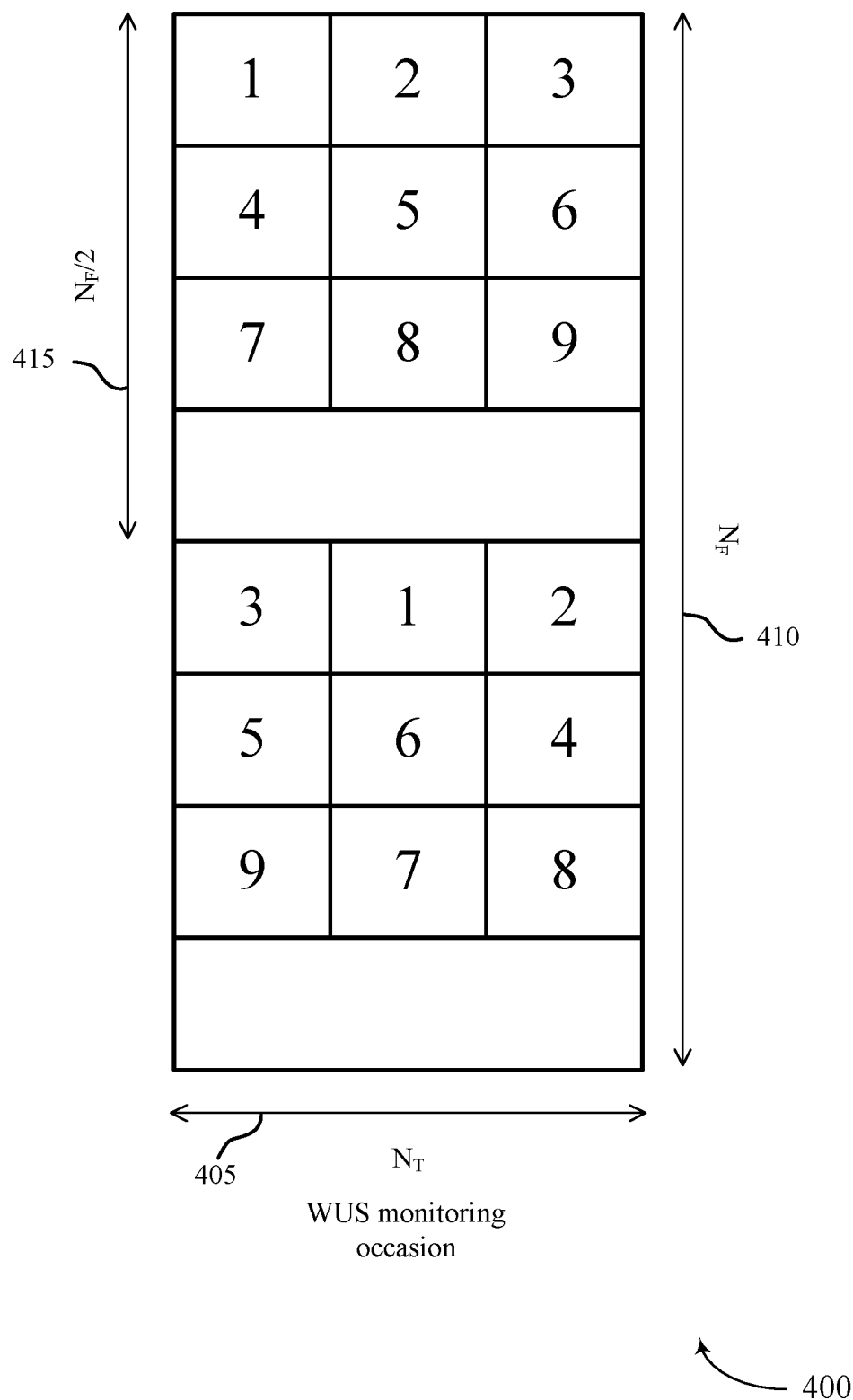
FIG. 4 illustrates an example resource determination for resource allocation for bi-directional sidelink wakeup and paging in accordance with aspects of the present disclosure.

FIG. 4 illustrates an example resource determination for bi-directional sidelink WUS and paging transmission. The horizontal axis depicts time progressing forwards towards the right of the figure, and the vertical axis depicts frequencies available for the WUS and paging transmissions. $N_T$ 405 may refer to a number of resource units in the time domain of a WUS monitoring occasion. $N_F$ 410 may refer to a number of resource units in the frequency domain of a WUS monitoring occasion. $N_F/2$ 415 may refer to a number of resource units in the frequency domain of a WUS monitoring occasion that is one half of all the available frequency resource units $N_F$ 410.

As described herein, a first UE and a second UE may determine a resource allocation or assignment based on a WUS resource configuration received by the UE. In some examples, a joint index, z, may be established, upon which a first UE and a second UE may base their resource selection. The joint index z may be a value between 1 and $N_T*\text{floor}(N_F/2)$. As discussed herein, the joint index z may be determined based on one or more factors, rules, configurations, or other information. In some examples, the joint index z may be determined based on IDs of the first UE and the second UE. For example, the joint index z may be specific to or conveyed within the WUS resource configuration. In other examples, the joint index z may be determined based on a characteristic, parameter, ID, or other information available to the UEs. For example, the joint index z may be determined based on ID (e.g., L2 IDs) of the UEs.

In some examples, the first UE and the second UE may each then determine a pair of resources disjoint in time (e.g., time periods that do not overlap). In some examples, these resources may be indexed by ($n_{t1}$, $n_{f1}$) for the first resource and ($n_{t2}$, $n_{f2}$) for the second resource. In some examples, each of these indexed resources may be determined via a Latin square approach that allows the resources to be disjoint in time (e.g., do not overlap in time). In FIG. 4, each numeral may represent a different resource that may be available for transmitting a WUS or a paging signal and each numeral pair (e.g., pair of '1' indices, '2' indices, or the like) do not overlap in time. In this way, a pair of resources corresponding to the numeral pair may be identified for use by the first UE and the second UE such that the first UE is allocated one set of resources corresponding to one of the pair of resources, and the second UE is allocated the other set of resources corresponding to the other of the pair of resources.

The indices for a first resource ($n_{t1}$, $n_{f1}$) and a second resource ($n_{t2}$, $n_{f2}$) may be determined as follows. $n_{t1}$ may be determined by $n_{t1}=\text{mod}(z, N_T)$. $n_{f1}$ may be determined by $$n_{f1} = \text{floor}\left(\frac{z}{N_T}\right).$$

$n_{t2}$ may be determined by $$n_{t2} = \text{mod}\left(z + \text{mod}\left(\text{floor}\left(\frac{z}{N_T}\right)\right), N_t - 1\right) + 1, N_T\right).$$

$n_{f2}$ may be determined by $$n_{f2} = \text{floor}\left(\frac{N_f}{2}\right) + n_{f1}.$$

Once each UE has determined these indices and thereby determined a pair of resources to be used for WUS transmissions, the UEs may then determine which UE is to use which resource in the pair of resources identified by the determination process. In some examples, the UEs may utilize a rule that is already known to each UE. For example, the UE that has a smaller ID (e.g., an L2 ID) may utilize the resource that is first in time, and the UE that has a larger ID may utilize the resource that is later in time. Alternatively, the UE that has a larger ID (e.g., an L2 ID) may utilize the resource that occurs first in time, and the UE that has a smaller ID may utilize the resource that occurs later in time. Additionally, or alternatively, the two UEs may alternate in selecting the resource that occurs first in time. In some examples, a different rule, configuration, or determination may be used to coordinate which UE will use which resource determined by the techniques described herein.

In some conditions, the determination of resources disjoint in time may be simplified. For example, in cases in which a WUS monitoring occasion contains only two time domain resource units (e.g., $N_T$=2), the determination may be simplified such that one UE will use the resource(s) with an odd time index, and the other UE will use the resource(s) with an even time index. Similar approaches to those described herein may be used to determine which UE may utilize which resource (e.g., the odd time index resource or the even time index resource).

Figure 5:
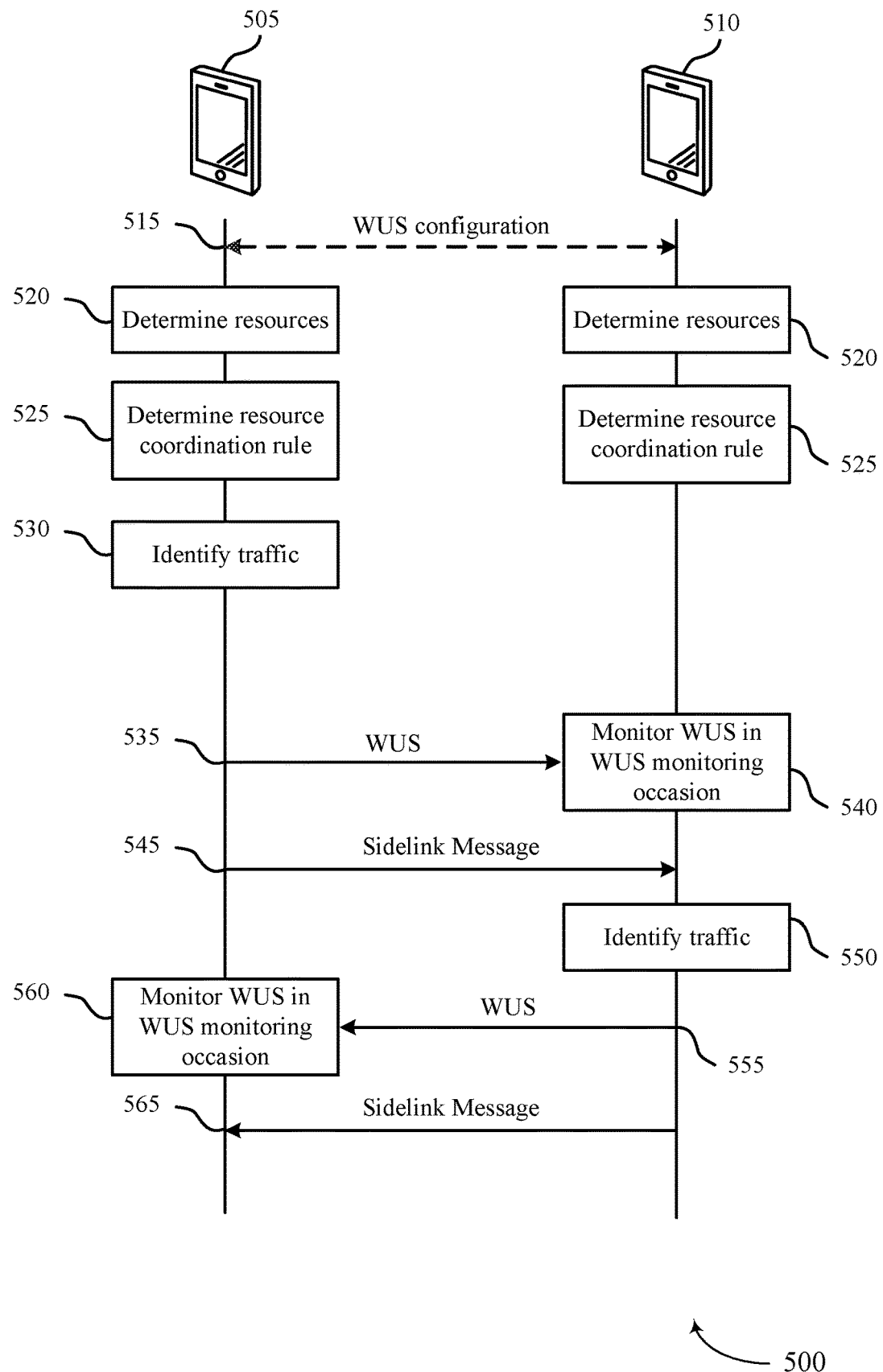
FIG. 5 illustrates an example of a process flow that supports techniques for resource allocation for bi-directional sidelink wakeup and paging in accordance with aspects of the present disclosure.

FIG. 5 illustrates an example of a process flow 500 that supports techniques for resource determination for bi-directional sidelink WUS and paging transmission. The process flow includes operations, signaling, or other procedure performed by a first UE 505 or a second UE 510, which may be examples of the corresponding devices as described herein.

At 515, the first UE 505 may identify a WUS configuration for the first UE 505, which may be exchanged between the first UE 505 and the second UE 510. In some examples, the WUS configuration indicates a WUS monitoring occasion (e.g., as part of a WUS configuration) for sidelink wakeup signaling between the first UE 505 and the second UE 510. In some examples, the second UE 510 may identify a WUS configuration for the second UE 510, which may be exchanged between the first UE 505 and the second UE 510. The WUS configuration may be an example of WUS resource configuration 235 discussed in relation to FIG. 2.

In some examples, the first UE 505 may receive an indication of the WUS configuration from the second UE 510. In some examples, the first UE 505, and optionally the second UE 510, may receive the indication of the WUS configuration from a base station. In some cases, the WUS configuration may indicate a joint index for the first UE 505 and the second UE 510.

At 520, the first UE 505 and the second UE 510 may determine resources for sidelink wakeup signaling or paging. For example, the resources may include a first set of resources and a second set of resources within a WUS monitoring occasion or paging monitoring occasion (e.g., a DRX on duration). In some cases, the first and second sets of resources may be disjoint in time. For example, the resources may be determined via a Latin square approach as described herein with respect to FIG. 4.

In some examples, the resources may include a number of time resources and a number of frequency resources of the WUS monitoring occasion. In some examples, the first set of resources and the second set of resources may be determined based on the number of time resources and the number of frequency resources of the WUS monitoring occasion.

At 525, the first UE 505 and optionally, the second UE 510, may determine a coordination rule between the first UE 505 and the second UE 510 for the determined resources. For example, the first and second sets of resources may each be determined in accordance with the coordination rule. In some examples, the coordination rule may indicate the first set of resources or the second set of resources based on a comparison of IDs associated with the first UE 505 and the second UE 510. For instance, the first UE 505 may have a lower ID and may utilize the first set of resources if the first set of resources occur earlier in time. The second UE 510 may have a higher ID and may utilize the second set of resources if the second set of resources occur later in time. The first UE 505 may use odd indexed resources and the second UE 510 may use even indexed resources based on the resource coordination rule.

In some examples, the first UE 505 or the second UE 510 may determine a hopping pattern for a sidelink control channel between the first UE 505 and the second UE 510. In some examples, the resource coordination rule may indicate that the first UE 505 is to use the first set of resources based on the hopping pattern and the second UE 510 may use the second set of resources based on the hopping pattern.

In some examples, the WUS monitoring occasion may include two time-domain resource units. In some examples, the first set of resources may be a first time-domain resource of the two time-domain resource units based at least in part on an identifier of the first UE 505. In some examples, the first time-domain resource may correspond to one of an odd time index value or an even time index value.

Each of the first UE 505 and the second UE 510 may use the determined resources and respective ones of the first set and second set of resources for transmission of a WUS to the other UE. For example, at 530, the first UE 505 may identify traffic to be transmitted to the second UE 510 via sidelink communication. For example, the first UE 505 may identify that there is traffic (e.g., traffic generated by the first UE 505 at an upper layer) that is to be transmitted to the second UE 510. As such, the first UE 505 may determine to transmit a WUS or paging signal to the second UE 510. Such a determination may be based on the WUS configuration or other information.

At 535, the first UE 505 may transmit the WUS to the second UE 510 using the first set of resources within the WUS monitoring occasion in accordance with the resource coordination rule.

At 540, the second UE 510 may monitor the WUS monitoring occasion for the WUS transmitted by the first UE 505 at 535. For example, the second UE 510 may monitor the first set of resources within a WUS monitoring occasion according to a WUS period as described in FIGS. 3A and 3B. In some cases, the second UE 510 may receive the WUS based on the monitoring.

At 545, the first UE 505 may transmit a sidelink control message (e.g., SCI), a sidelink data message, or both to the second UE 510 based on the traffic identified at 530. The sidelink control message may include configuration information or scheduling information for the traffic identified at 530, or may include other communications.

At 550, the second UE 510 may identify traffic for transmission to the first UE 505 via sidelink communication. For example, the second UE 510 may identify that there is traffic (e.g., traffic generated by the second UE 510 at an upper layer) that is to be transmitted to the first UE 505. As such, the second UE 510 may determine to transmit a WUS or paging signal to the first UE 505. Such a determination may be based on the WUS configuration or other information.

At 555, the second UE 510 may transmit the WUS to the first UE 505 using the second set of resources within the WUS monitoring occasion in accordance with the resource coordination rule.

At 560, the first UE 505 may monitor the WUS monitoring occasion for the WUS transmitted by the second UE 510 at 555. For example, the first UE 505 may monitor the second set of resources within a WUS monitoring occasion according to a WUS period as described in FIGS. 3A and 3B. In some cases, the first UE 505 may receive the WUS based on the monitoring.

At 565, the second UE 510 may transmit a sidelink control message (e.g., SCI), a sidelink data message, or both to the first UE 505 based on the traffic identified at 550. The sidelink control message may include configuration information or scheduling information for the traffic identified at 550, or may include other communications.

Figure 6:
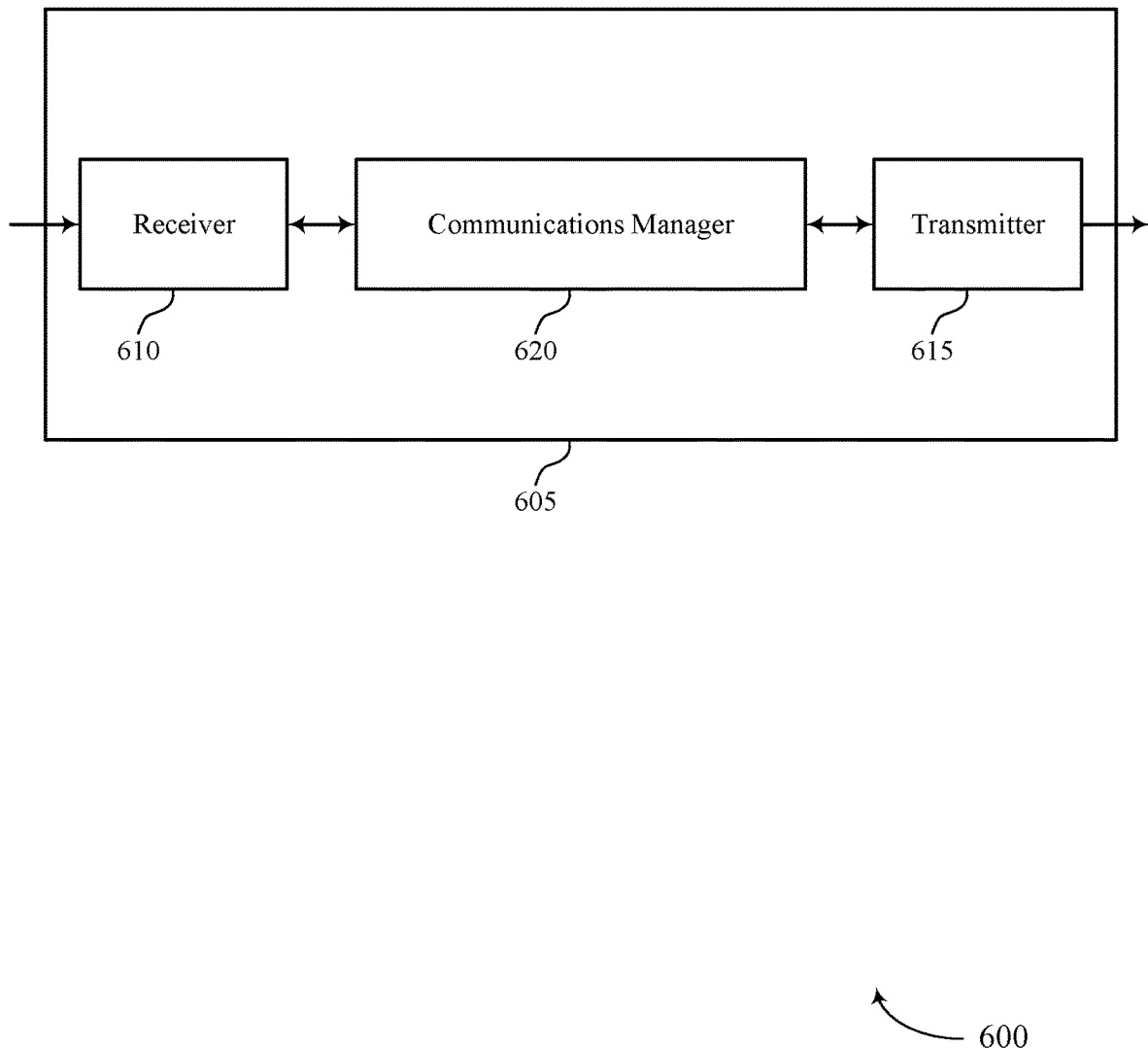
FIGS. 6 and 7 show block diagrams of devices that support resource allocation for bi-directional sidelink wakeup and paging in accordance with aspects of the present disclosure.

FIG. 6 shows a block diagram 600 of a device 605 that supports resource allocation for bi-directional sidelink wakeup and paging in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to resource allocation for bi-directional sidelink wakeup and paging). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to resource allocation for bi-directional sidelink wakeup and paging). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of resource allocation for bi-directional sidelink wakeup and paging as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first UE in accordance with examples as disclosed herein. For example, the communications manager 620 may be configured as or otherwise support a means for identifying an indication of a WUS configuration for the first UE, the WUS configuration indicating a WUS monitoring occasion for sidelink wakeup signaling between the first UE and a second UE. The communications manager 620 may be configured as or otherwise support a means for determining a first set of resources for transmission of a WUS by the first UE within the WUS monitoring occasion based on the WUS configuration, the first set of resources disjoint in time with a second set of resources for the second UE within the WUS monitoring occasion. The communications manager 620 may be configured as or otherwise support a means for transmitting the WUS to the second UE using the first set of resources within the WUS monitoring occasion based on an identification of traffic for the second UE at the first UE.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced power consumption, and more efficient utilization of communication resources.

Figure 7:
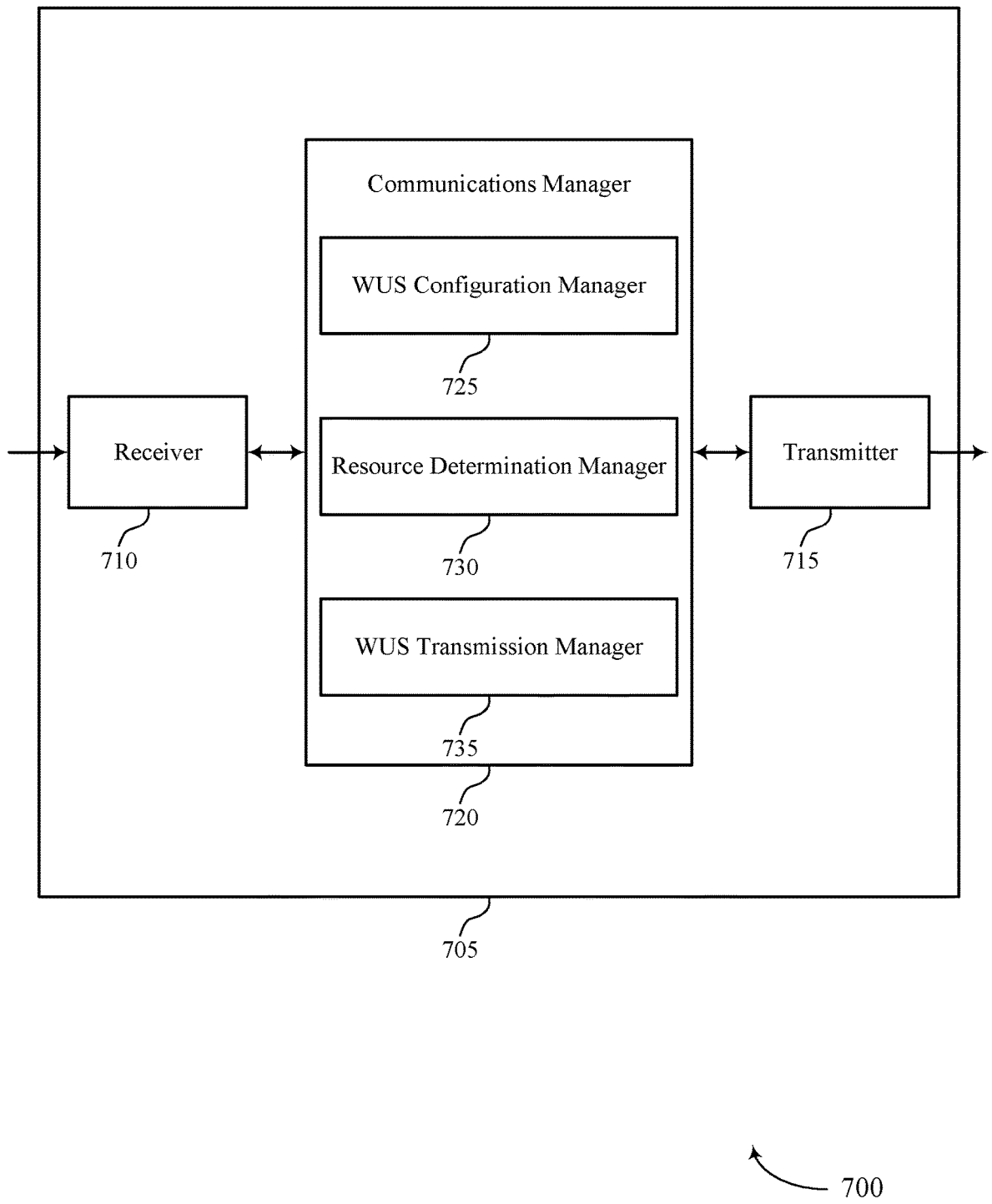

FIG. 7 shows a block diagram 700 of a device 705 that supports resource allocation for bi-directional sidelink wakeup and paging in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to resource allocation for bi-directional sidelink wakeup and paging). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to resource allocation for bi-directional sidelink wakeup and paging). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of resource allocation for bi-directional sidelink wakeup and paging as described herein. For example, the communications manager 720 may include a WUS configuration manager 725, a resource determination manager 730, a WUS transmission manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first UE in accordance with examples as disclosed herein. The WUS configuration manager 725 may be configured as or otherwise support a means for identifying an indication of a WUS configuration for the first UE, the WUS configuration indicating a WUS monitoring occasion for sidelink wakeup signaling between the first UE and a second UE. The resource determination manager 730 may be configured as or otherwise support a means for determining a first set of resources for transmission of a WUS by the first UE within the WUS monitoring occasion based on the WUS configuration, the first set of resources disjoint in time with a second set of resources for the second UE within the WUS monitoring occasion. The WUS transmission manager 735 may be configured as or otherwise support a means for transmitting the WUS to the second UE using the first set of resources within the WUS monitoring occasion based on an identification of traffic for the second UE at the first UE.

Figure 8:
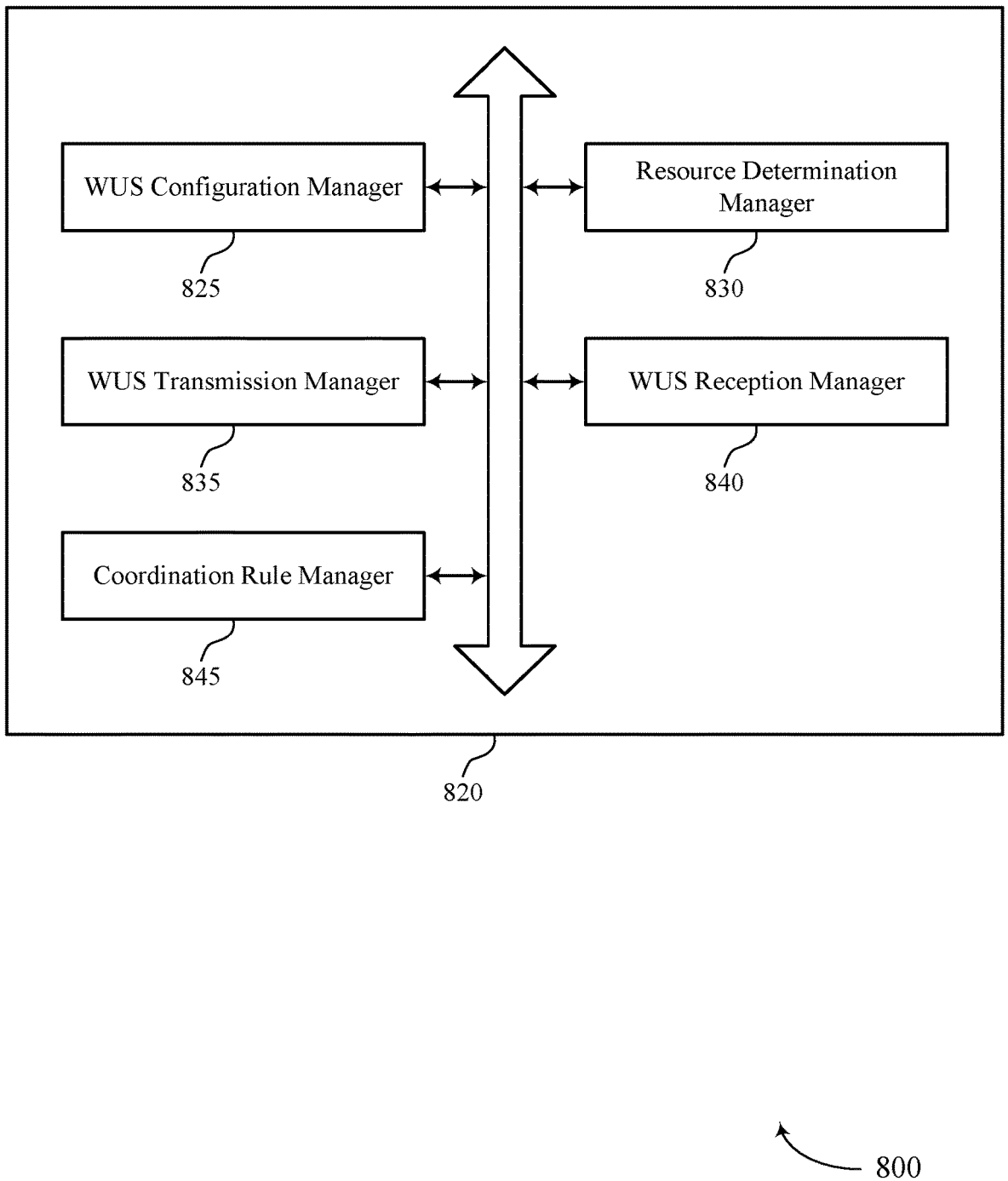
FIG. 8 shows a block diagram of a communications manager that supports resource allocation for bi-directional sidelink wakeup and paging in accordance with aspects of the present disclosure.

FIG. 8 shows a block diagram 800 of a communications manager 820 that supports resource allocation for bi-directional sidelink wakeup and paging in accordance with aspects of the present disclosure. The communications manager 820 may be an example of aspects of a communications manager 620, a communications manager 720, or both, as described herein. The communications manager 820, or various components thereof, may be an example of means for performing various aspects of resource allocation for bi-directional sidelink wakeup and paging as described herein. For example, the communications manager 820 may include a WUS configuration manager 825, a resource determination manager 830, a WUS transmission manager 835, a WUS reception manager 840, a coordination rule manager 845, or any combination thereof. Each of these components may communicate, directly or indirectly, with one another (e.g., via one or more buses).

The communications manager 820 may support wireless communications at a first UE in accordance with examples as disclosed herein. The WUS configuration manager 825 may be configured as or otherwise support a means for identifying an indication of a WUS configuration for the first UE, the WUS configuration indicating a WUS monitoring occasion for sidelink wakeup signaling between the first UE and a second UE. The resource determination manager 830 may be configured as or otherwise support a means for determining a first set of resources for transmission of a WUS by the first UE within the WUS monitoring occasion based on the WUS configuration, the first set of resources disjoint in time with a second set of resources for the second UE within the WUS monitoring occasion. The WUS transmission manager 835 may be configured as or otherwise support a means for transmitting the WUS to the second UE using the first set of resources within the WUS monitoring occasion based on an identification of traffic for the second UE at the first UE.

In some examples, the resource determination manager 830 may be configured as or otherwise support a means for determining a joint index for the first UE and the second UE.

In some examples, the resource determination manager 830 may be configured as or otherwise support a means for determining the first set of resources based on the joint index. In some examples, the resource determination manager 830 may be configured as or otherwise support a means for determining the second set of resources for the second UE based on the joint index.

In some examples, the joint index is indicated in the WUS configuration.

In some examples, the resource determination manager 830 may be configured as or otherwise support a means for determining a number of time resources and a number of frequency resources of the WUS monitoring occasion, where the first set of resources is determined based on the number of time resources and the number of frequency resources of the WUS monitoring occasion.

In some examples, the resource determination manager 830 may be configured as or otherwise support a means for determining the first set of resources based on an identifier of the first UE and the joint index for the first UE and the second UE.

In some examples, the coordination rule manager 845 may be configured as or otherwise support a means for determining a coordination rule between the first UE and the second UE, where the first set of resources is determined in accordance with the coordination rule, where the coordination rule indicates the first set of resources or the second set of resources based on a comparison of identifiers associated with the first UE and the second UE.

In some examples, the resource determination manager 830 may be configured as or otherwise support a means for determining a hopping pattern for a sidelink control channel between the first UE and the second UE, where the first set of resources is determined based on the hopping pattern.

In some examples, the WUS monitoring occasion includes two time-domain resource units, and the resource determination manager 830 may be configured as or otherwise support a means for determining the first set of resources to be a first time-domain resource of the two time-domain resource units based on an identifier of the first UE, the first time-domain resource corresponding to one of an odd time index value or an even time index value.

In some examples, the WUS reception manager 840 may be configured as or otherwise support a means for monitoring the second set of resources for a second WUS from the second UE based on the WUS configuration.

In some examples, the WUS reception manager 840 may be configured as or otherwise support a means for receiving the second WUS from the second UE based on the monitoring. In some examples, the WUS reception manager 840 may be configured as or otherwise support a means for monitoring for a sidelink transmission from the second UE based on receiving the second WUS.

In some examples, to support identifying the indication of the WUS configuration, the WUS configuration manager 825 may be configured as or otherwise support a means for receiving the indication of the WUS configuration from the second UE or from a base station.

Figure 9:
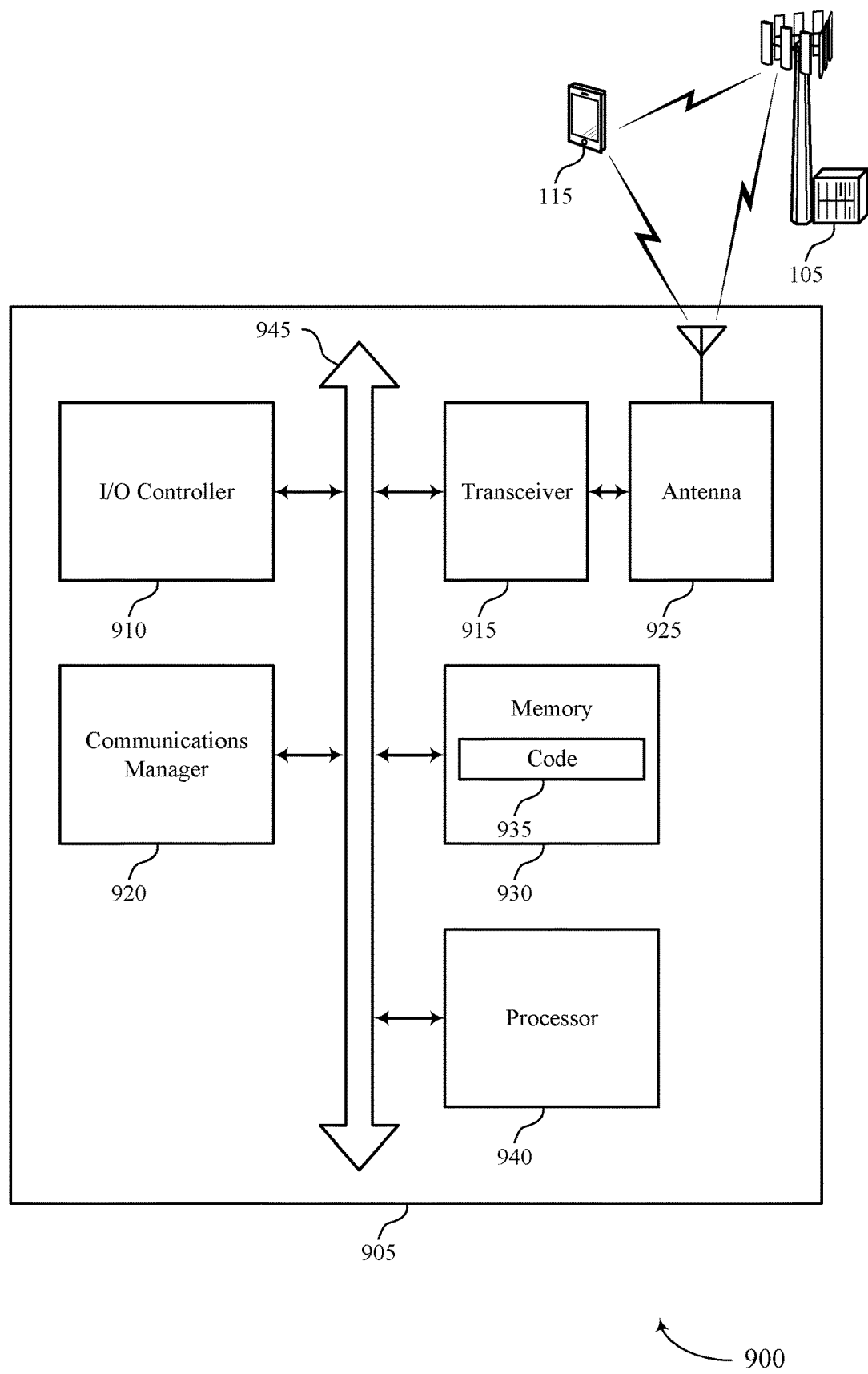
FIG. 9 shows a diagram of a system including a device that supports resource allocation for bi-directional sidelink wakeup and paging in accordance with aspects of the present disclosure.

FIG. 9 shows a diagram of a system 900 including a device 905 that supports resource allocation for bi-directional sidelink wakeup and paging in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting resource allocation for bi-directional sidelink wakeup and paging). For example, the device 905 or a component of the device 905 may include a processor 940 and memory 930 coupled to the processor 940, the processor 940 and memory 930 configured to perform various functions described herein.

The communications manager 920 may support wireless communications at a first UE in accordance with examples as disclosed herein. For example, the communications manager 920 may be configured as or otherwise support a means for identifying an indication of a WUS configuration for the first UE, the WUS configuration indicating a WUS monitoring occasion for sidelink wakeup signaling between the first UE and a second UE. The communications manager 920 may be configured as or otherwise support a means for determining a first set of resources for transmission of a WUS by the first UE within the WUS monitoring occasion based on the WUS configuration, the first set of resources disjoint in time with a second set of resources for the second UE within the WUS monitoring occasion. The communications manager 920 may be configured as or otherwise support a means for transmitting the WUS to the second UE using the first set of resources within the WUS monitoring occasion based on an identification of traffic for the second UE at the first UE.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, and longer battery life.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of resource allocation for bi-directional sidelink wakeup and paging as described herein, or the processor 940 and the memory 930 may be otherwise configured to perform or support such operations.

Figure 10:
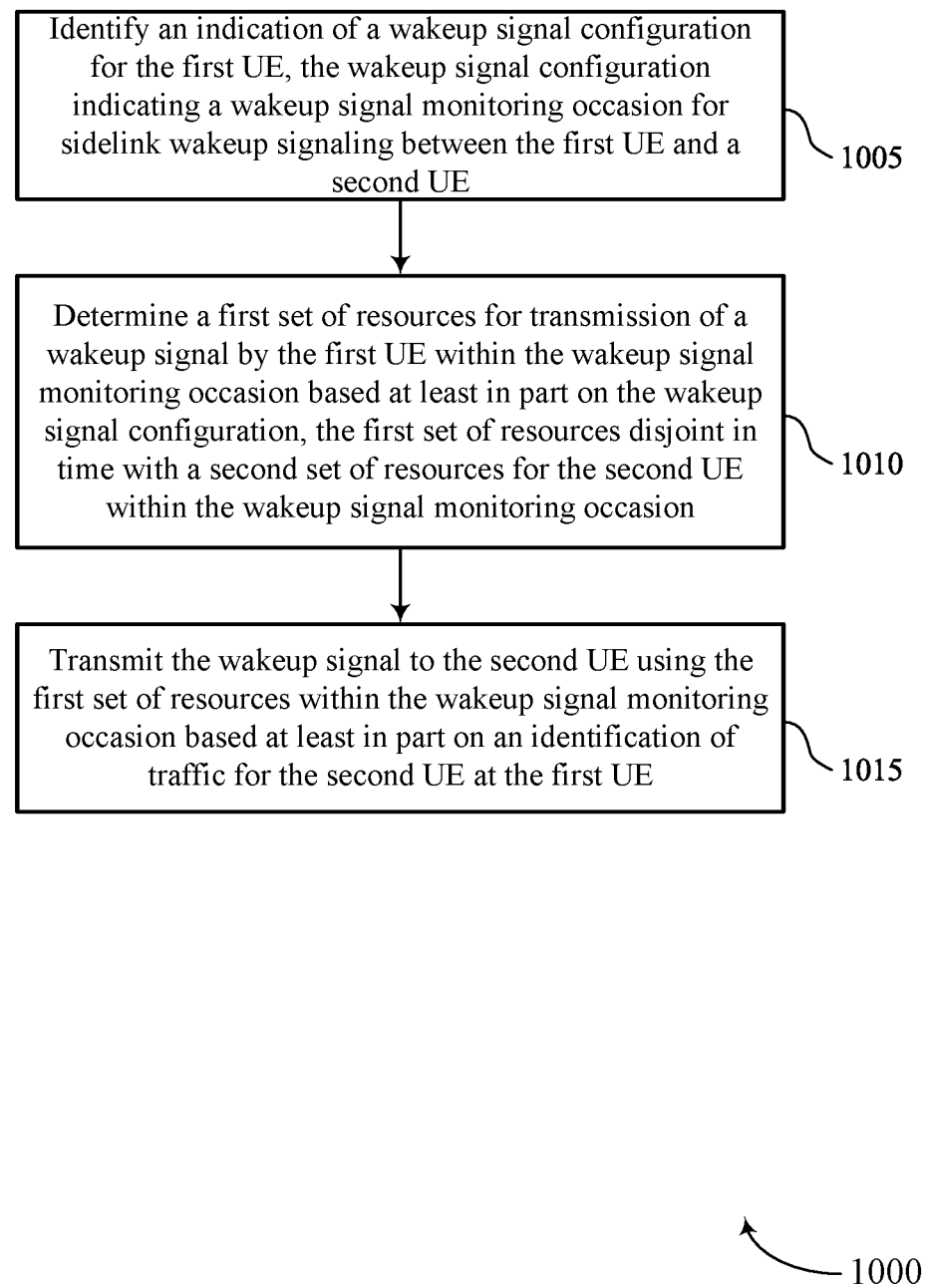
FIGS. 10 through 15 show flowcharts illustrating methods that support resource allocation for bi-directional sidelink wakeup and paging in accordance with aspects of the present disclosure.

FIG. 10 shows a flowchart illustrating a method 1000 that supports resource allocation for bi-directional sidelink wakeup and paging in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include identifying an indication of a WUS configuration for the first UE, the WUS configuration indicating a WUS monitoring occasion for sidelink wakeup signaling between the first UE and a second UE. The operations of 1005 may be performed in accordance with examples as disclosed herein. In some examples, aspects of the operations of 1005 may be performed by a WUS configuration manager 825 as described with reference to FIG. 8.

At 1010, the method may include determining a first set of resources for transmission of a WUS by the first UE within the WUS monitoring occasion based on the WUS configuration, the first set of resources disjoint in time with a second set of resources for the second UE within the WUS monitoring occasion. The operations of 1010 may be performed in accordance with examples as disclosed herein. In some examples, aspects of the operations of 1010 may be performed by a resource determination manager 830 as described with reference to FIG. 8.

At 1015, the method may include transmitting the WUS to the second UE using the first set of resources within the WUS monitoring occasion based on an identification of traffic for the second UE at the first UE. The operations of 1015 may be performed in accordance with examples as disclosed herein. In some examples, aspects of the operations of 1015 may be performed by a WUS transmission manager 835 as described with reference to FIG. 8.

Figure 11:
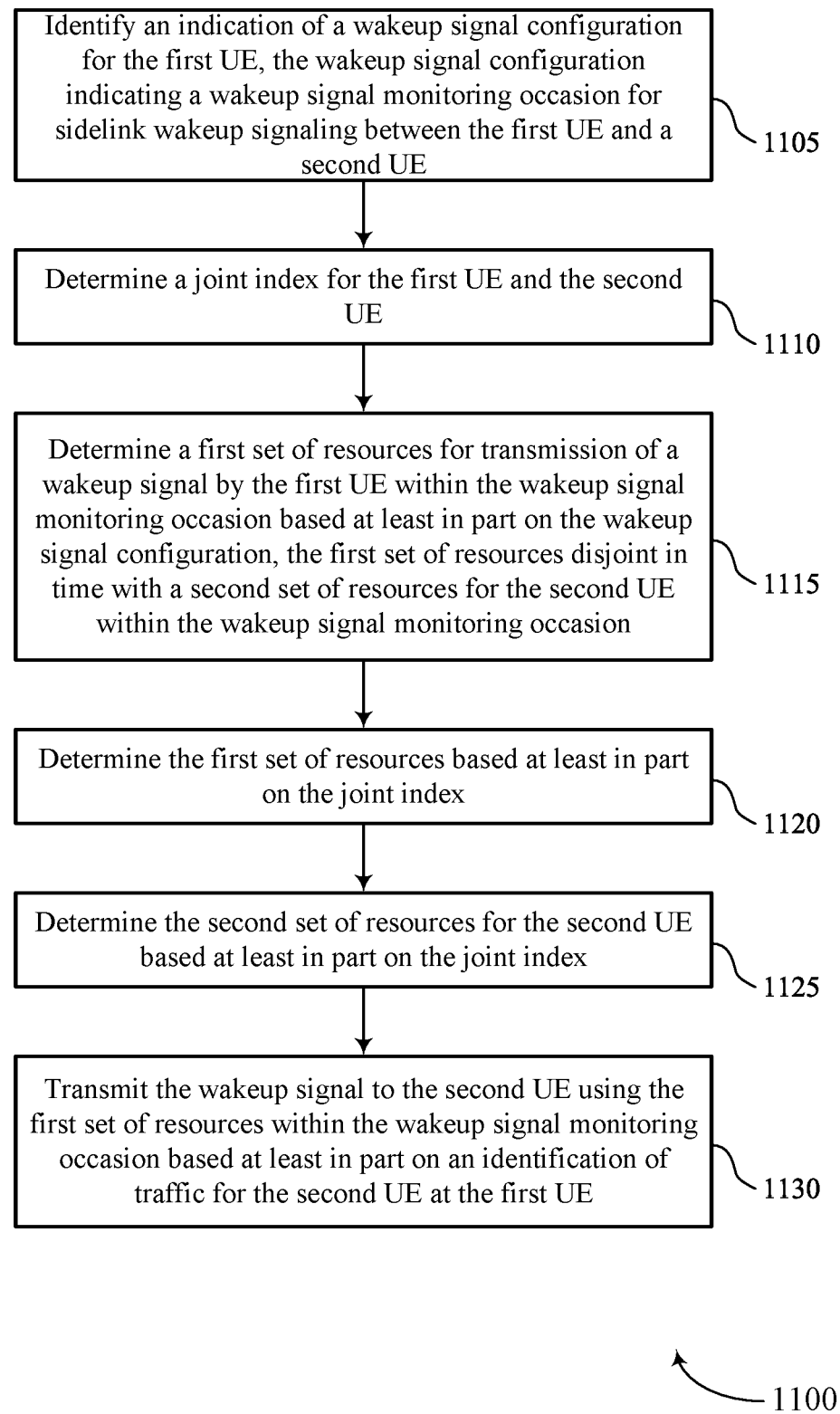

FIG. 11 shows a flowchart illustrating a method 1100 that supports resource allocation for bi-directional sidelink wakeup and paging in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include identifying an indication of a WUS configuration for the first UE, the WUS configuration indicating a WUS monitoring occasion for sidelink wakeup signaling between the first UE and a second UE. The operations of 1105 may be performed in accordance with examples as disclosed herein. In some examples, aspects of the operations of 1105 may be performed by a WUS configuration manager 825 as described with reference to FIG. 8.

At 1110, the method may include determining a joint index for the first UE and the second UE. The operations of 1110 may be performed in accordance with examples as disclosed herein. In some examples, aspects of the operations of 1110 may be performed by a resource determination manager 830 as described with reference to FIG. 8.

At 1115, the method may include determining a first set of resources for transmission of a WUS by the first UE within the WUS monitoring occasion based on the WUS configuration, the first set of resources disjoint in time with a second set of resources for the second UE within the WUS monitoring occasion. The operations of 1115 may be performed in accordance with examples as disclosed herein. In some examples, aspects of the operations of 1115 may be performed by a resource determination manager 830 as described with reference to FIG. 8.

At 1120, the method may include determining the first set of resources based on the joint index. The operations of 1120 may be performed in accordance with examples as disclosed herein. In some examples, aspects of the operations of 1120 may be performed by a resource determination manager 830 as described with reference to FIG. 8.

At 1125, the method may include determining the second set of resources for the second UE based on the joint index. The operations of 1125 may be performed in accordance with examples as disclosed herein. In some examples, aspects of the operations of 1125 may be performed by a resource determination manager 830 as described with reference to FIG. 8.

At 1130, the method may include transmitting the WUS to the second UE using the first set of resources within the WUS monitoring occasion based on an identification of traffic for the second UE at the first UE. The operations of 1130 may be performed in accordance with examples as disclosed herein. In some examples, aspects of the operations of 1130 may be performed by a WUS transmission manager 835 as described with reference to FIG. 8.

Figure 12:
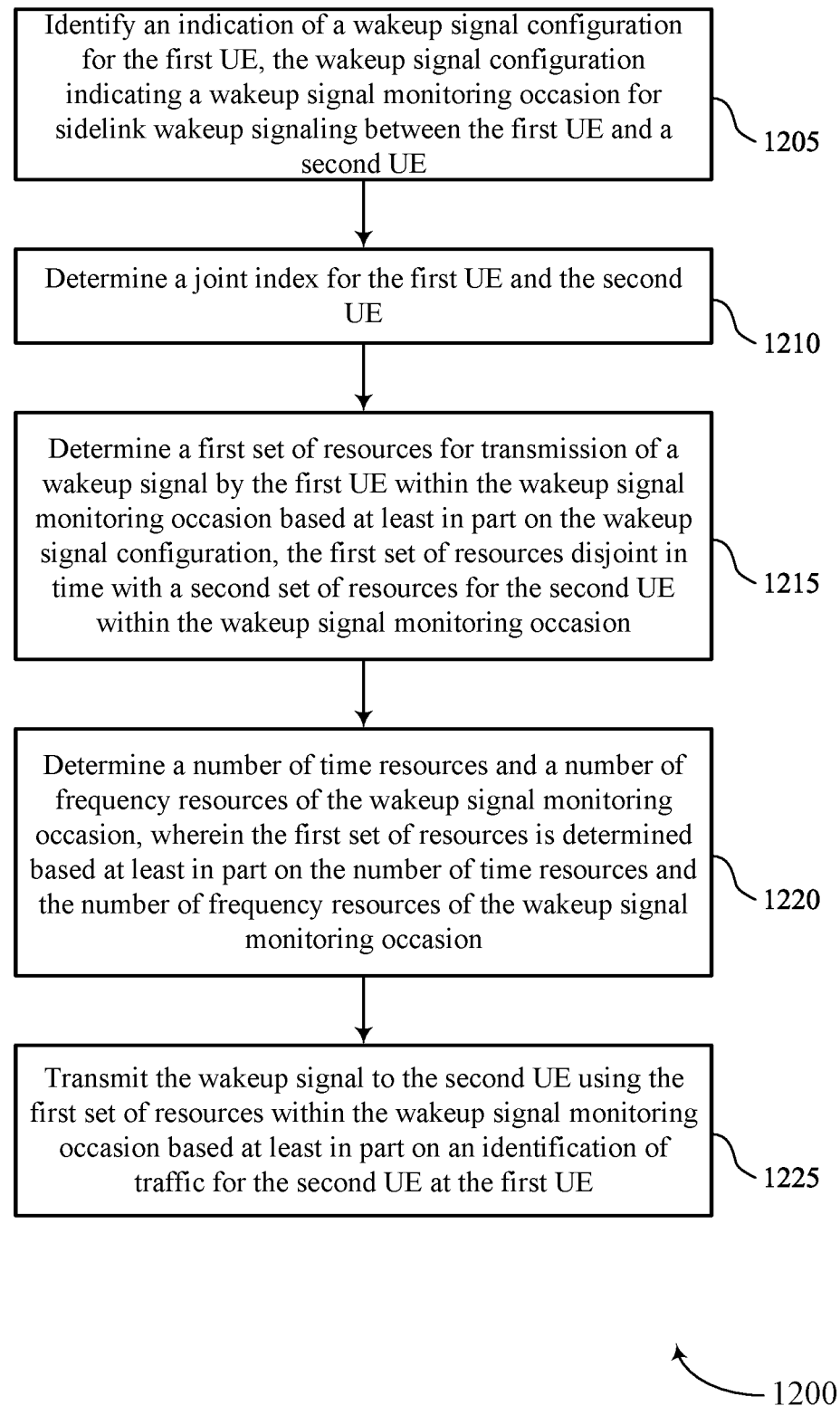

FIG. 12 shows a flowchart illustrating a method 1200 that supports resource allocation for bi-directional sidelink wakeup and paging in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include identifying an indication of a WUS configuration for the first UE, the WUS configuration indicating a WUS monitoring occasion for sidelink wakeup signaling between the first UE and a second UE. The operations of 1205 may be performed in accordance with examples as disclosed herein. In some examples, aspects of the operations of 1205 may be performed by a WUS configuration manager 825 as described with reference to FIG. 8.

At 1210, the method may include determining a joint index for the first UE and the second UE. The operations of 1210 may be performed in accordance with examples as disclosed herein. In some examples, aspects of the operations of 1210 may be performed by a resource determination manager 830 as described with reference to FIG. 8.

At 1215, the method may include determining a first set of resources for transmission of a WUS by the first UE within the WUS monitoring occasion based on the WUS configuration, the first set of resources disjoint in time with a second set of resources for the second UE within the WUS monitoring occasion. The operations of 1215 may be performed in accordance with examples as disclosed herein. In some examples, aspects of the operations of 1215 may be performed by a resource determination manager 830 as described with reference to FIG. 8.

At 1220, the method may include determining a number of time resources and a number of frequency resources of the WUS monitoring occasion, where the first set of resources is determined based on the number of time resources and the number of frequency resources of the WUS monitoring occasion. The operations of 1220 may be performed in accordance with examples as disclosed herein. In some examples, aspects of the operations of 1220 may be performed by a resource determination manager 830 as described with reference to FIG. 8.

At 1225, the method may include transmitting the WUS to the second UE using the first set of resources within the WUS monitoring occasion based on an identification of traffic for the second UE at the first UE. The operations of 1225 may be performed in accordance with examples as disclosed herein. In some examples, aspects of the operations of 1225 may be performed by a WUS transmission manager 835 as described with reference to FIG. 8.

Figure 13:
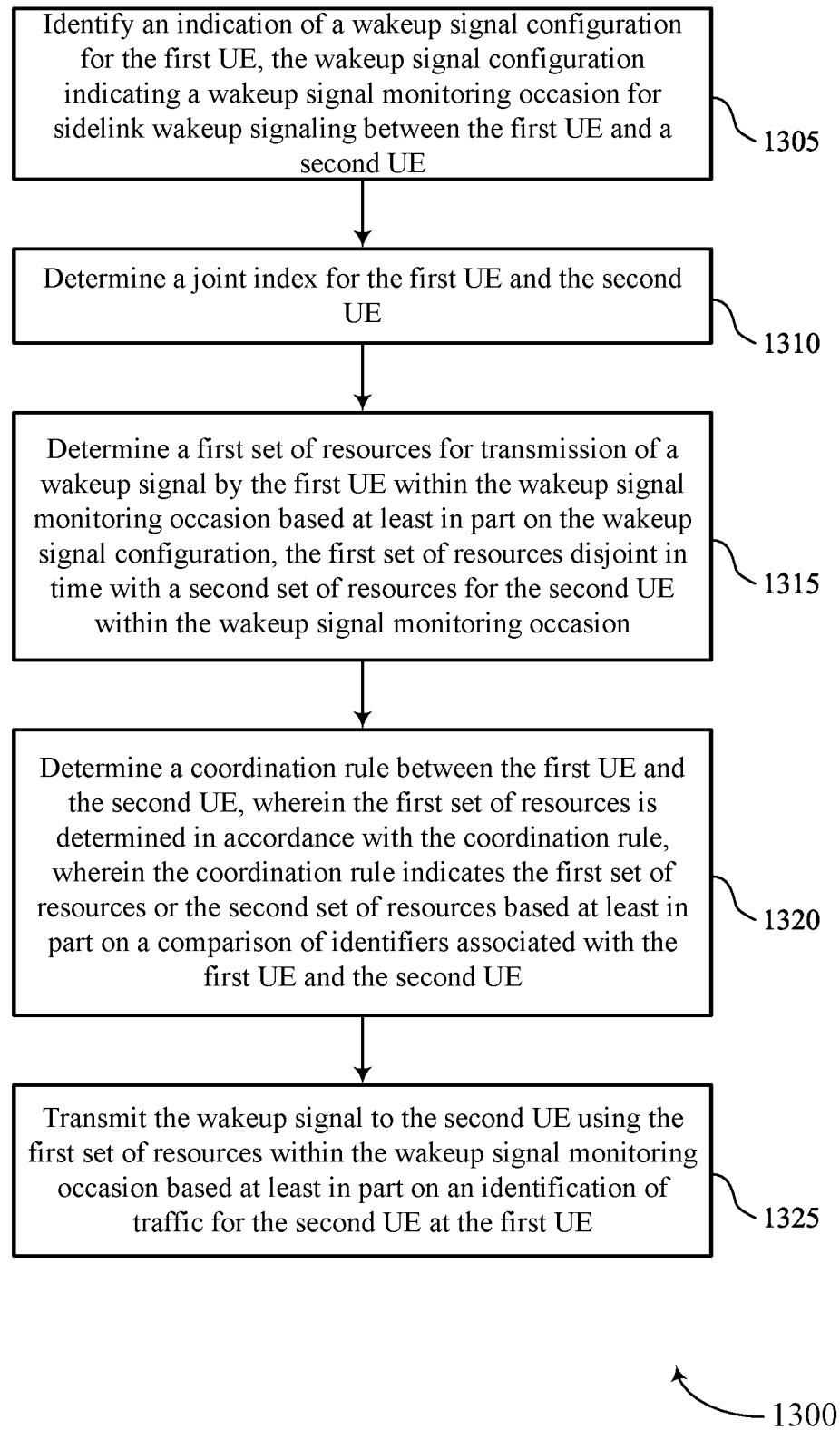

FIG. 13 shows a flowchart illustrating a method 1300 that supports resource allocation for bi-directional sidelink wakeup and paging in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include identifying an indication of a WUS configuration for the first UE, the WUS configuration indicating a WUS monitoring occasion for sidelink wakeup signaling between the first UE and a second UE. The operations of 1305 may be performed in accordance with examples as disclosed herein. In some examples, aspects of the operations of 1305 may be performed by a WUS configuration manager 825 as described with reference to FIG. 8.

At 1310, the method may include determining a joint index for the first UE and the second UE. The operations of 1310 may be performed in accordance with examples as disclosed herein. In some examples, aspects of the operations of 1310 may be performed by a resource determination manager 830 as described with reference to FIG. 8.

At 1315, the method may include determining a first set of resources for transmission of a WUS by the first UE within the WUS monitoring occasion based on the WUS configuration, the first set of resources disjoint in time with a second set of resources for the second UE within the WUS monitoring occasion. The operations of 1315 may be performed in accordance with examples as disclosed herein. In some examples, aspects of the operations of 1315 may be performed by a resource determination manager 830 as described with reference to FIG. 8.

At 1320, the method may include determining a coordination rule between the first UE and the second UE, where the first set of resources is determined in accordance with the coordination rule, where the coordination rule indicates the first set of resources or the second set of resources based on a comparison of identifiers associated with the first UE and the second UE. The operations of 1320 may be performed in accordance with examples as disclosed herein. In some examples, aspects of the operations of 1320 may be performed by a coordination rule manager 845 as described with reference to FIG. 8.

At 1325, the method may include transmitting the WUS to the second UE using the first set of resources within the WUS monitoring occasion based on an identification of traffic for the second UE at the first UE. The operations of 1325 may be performed in accordance with examples as disclosed herein. In some examples, aspects of the operations of 1325 may be performed by a WUS transmission manager 835 as described with reference to FIG. 8.

Figure 14:
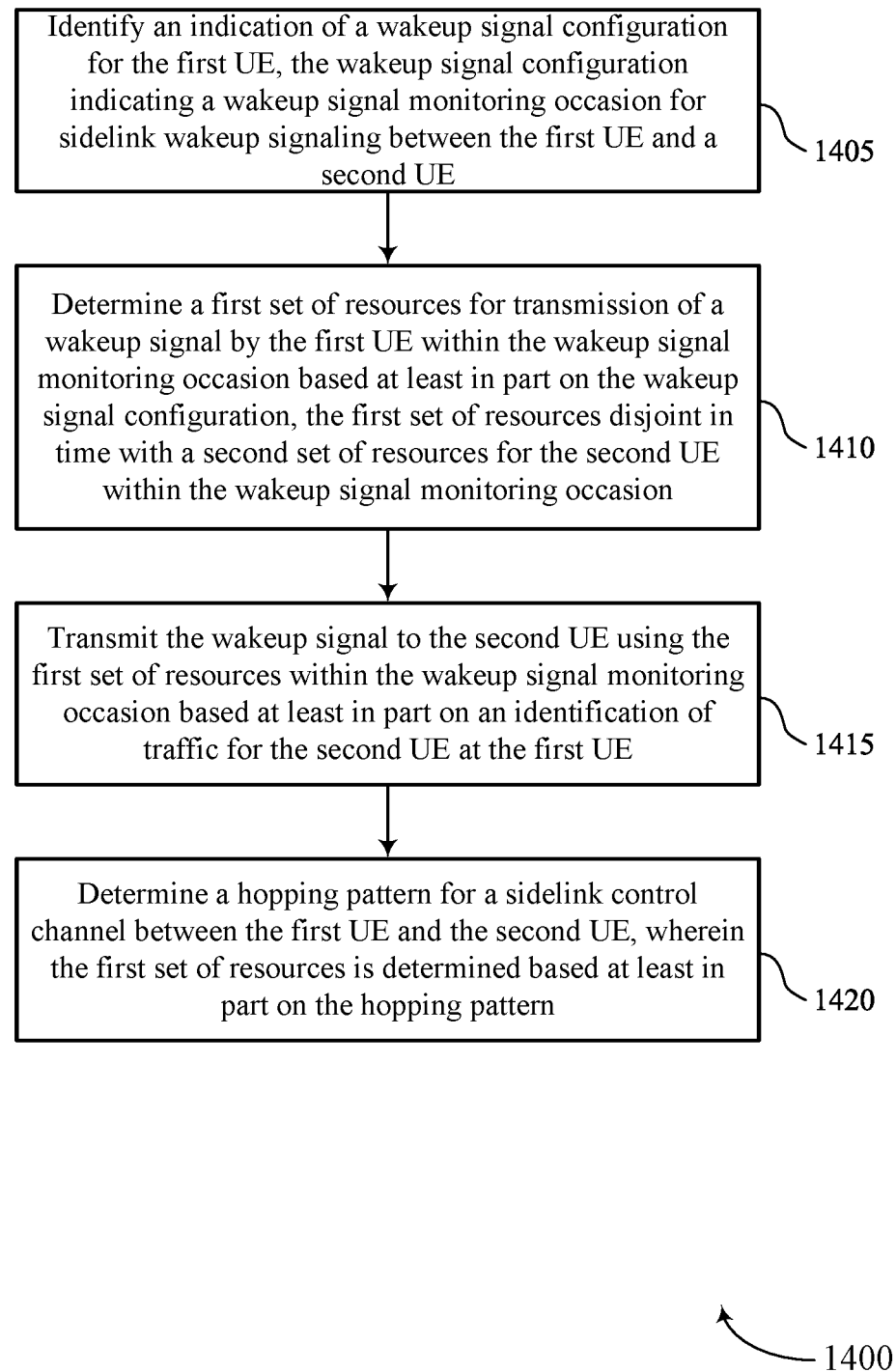

FIG. 14 shows a flowchart illustrating a method 1400 that supports resource allocation for bi-directional sidelink wakeup and paging in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include identifying an indication of a WUS configuration for the first UE, the WUS configuration indicating a WUS monitoring occasion for sidelink wakeup signaling between the first UE and a second UE. The operations of 1405 may be performed in accordance with examples as disclosed herein. In some examples, aspects of the operations of 1405 may be performed by a WUS configuration manager 825 as described with reference to FIG. 8.

At 1410, the method may include determining a first set of resources for transmission of a WUS by the first UE within the WUS monitoring occasion based on the WUS configuration, the first set of resources disjoint in time with a second set of resources for the second UE within the WUS monitoring occasion. The operations of 1410 may be performed in accordance with examples as disclosed herein. In some examples, aspects of the operations of 1410 may be performed by a resource determination manager 830 as described with reference to FIG. 8.

At 1415, the method may include transmitting the WUS to the second UE using the first set of resources within the WUS monitoring occasion based on an identification of traffic for the second UE at the first UE. The operations of 1415 may be performed in accordance with examples as disclosed herein. In some examples, aspects of the operations of 1415 may be performed by a WUS transmission manager 835 as described with reference to FIG. 8.

At 1420, the method may include determining a hopping pattern for a sidelink control channel between the first UE and the second UE, where the first set of resources is determined based on the hopping pattern. The operations of 1420 may be performed in accordance with examples as disclosed herein. In some examples, aspects of the operations of 1420 may be performed by a resource determination manager 830 as described with reference to FIG. 8.

Figure 15:
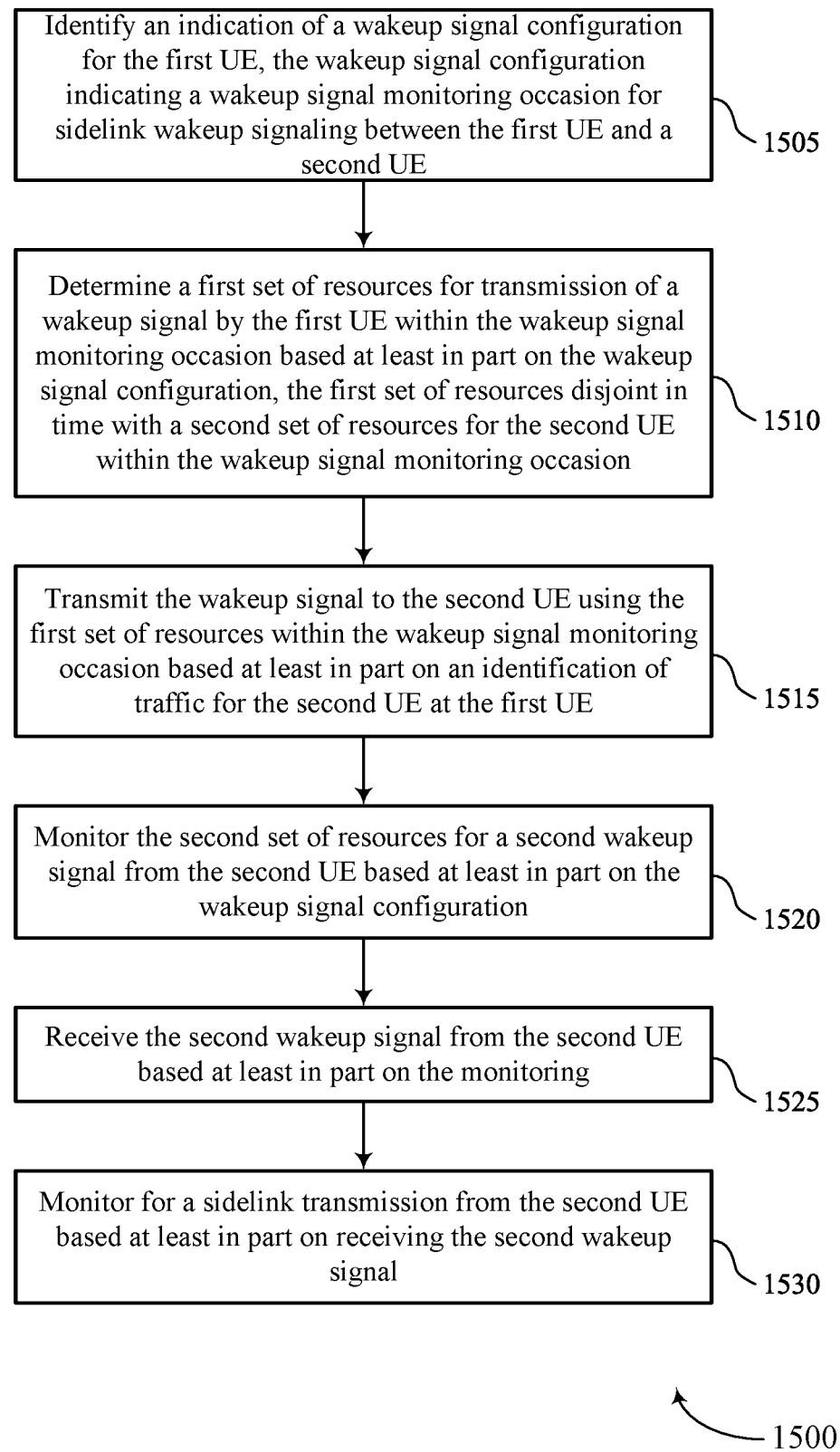

FIG. 15 shows a flowchart illustrating a method 1500 that supports resource allocation for bi-directional sidelink wakeup and paging in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include identifying an indication of a WUS configuration for the first UE, the WUS configuration indicating a WUS monitoring occasion for sidelink wakeup signaling between the first UE and a second UE. The operations of 1505 may be performed in accordance with examples as disclosed herein. In some examples, aspects of the operations of 1505 may be performed by a WUS configuration manager 825 as described with reference to FIG. 8.

At 1510, the method may include determining a first set of resources for transmission of a WUS by the first UE within the WUS monitoring occasion based on the WUS configuration, the first set of resources disjoint in time with a second set of resources for the second UE within the WUS monitoring occasion. The operations of 1510 may be performed in accordance with examples as disclosed herein. In some examples, aspects of the operations of 1510 may be performed by a resource determination manager 830 as described with reference to FIG. 8.

At 1515, the method may include transmitting the WUS to the second UE using the first set of resources within the WUS monitoring occasion based on an identification of traffic for the second UE at the first UE. The operations of 1515 may be performed in accordance with examples as disclosed herein. In some examples, aspects of the operations of 1515 may be performed by a WUS transmission manager 835 as described with reference to FIG. 8.

At 1520, the method may include monitoring the second set of resources for a second WUS from the second UE based on the WUS configuration. The operations of 1520 may be performed in accordance with examples as disclosed herein. In some examples, aspects of the operations of 1520 may be performed by a WUS reception manager 840 as described with reference to FIG. 8.

At 1525, the method may include receiving the second WUS from the second UE based on the monitoring. The operations of 1525 may be performed in accordance with examples as disclosed herein. In some examples, aspects of the operations of 1525 may be performed by a WUS reception manager 840 as described with reference to FIG. 8.

At 1530, the method may include monitoring for a sidelink transmission from the second UE based on receiving the second WUS. The operations of 1530 may be performed in accordance with examples as disclosed herein. In some examples, aspects of the operations of 1530 may be performed by a WUS reception manager 840 as described with reference to FIG. 8.

The following provides an overview of aspects of the present disclosure:

Aspect 1: A method for wireless communications at a first UE, comprising: identifying an indication of a wakeup signal configuration for the first UE, the wakeup signal configuration indicating a wakeup signal monitoring occasion for sidelink wakeup signaling between the first UE and a second UE; determining a first set of resources for transmission of a wakeup signal by the first UE within the wakeup signal monitoring occasion based at least in part on the wakeup signal configuration, the first set of resources disjoint in time with a second set of resources for the second UE within the wakeup signal monitoring occasion; and transmitting the wakeup signal to the second UE using the first set of resources within the wakeup signal monitoring occasion based at least in part on an identification of traffic for the second UE at the first UE.

Aspect 2: The method of aspect 1, further comprising: determining a joint index for the first UE and the second UE.

Aspect 3: The method of aspect 2, further comprising: determining the first set of resources based at least in part on the joint index; and determining the second set of resources for the second UE based at least in part on the joint index.

Aspect 4: The method of any of aspects 2 through 3, wherein the joint index is indicated in the wakeup signal configuration.

Aspect 5: The method of any of aspects 2 through 4, further comprising: determining a number of time resources and a number of frequency resources of the wakeup signal monitoring occasion, wherein the first set of resources is determined based at least in part on the number of time resources and the number of frequency resources of the wakeup signal monitoring occasion.

Aspect 6: The method of any of aspects 2 through 5, further comprising: determining the first set of resources based at least in part on an identifier of the first UE and the joint index for the first UE and the second UE.

Aspect 7: The method of any of aspects 2 through 6, further comprising: determining a coordination rule between the first UE and the second UE, wherein the first set of resources is determined in accordance with the coordination rule, wherein the coordination rule indicates the first set of resources or the second set of resources based at least in part on a comparison of identifiers associated with the first UE and the second UE.

Aspect 8: The method of any of aspects 1 through 7, further comprising: determining a hopping pattern for a sidelink control channel between the first UE and the second UE, wherein the first set of resources is determined based at least in part on the hopping pattern.

Aspect 9: The method of any of aspects 1 through 8, wherein the wakeup signal monitoring occasion comprises two time-domain resource units, the method further comprising: determining the first set of resources to be a first time-domain resource of the two time-domain resource units based at least in part on an identifier of the first UE, the first time-domain resource corresponding to one of an odd time index value or an even time index value.

Aspect 10: The method of any of aspects 1 through 9, further comprising: monitoring the second set of resources for a second wakeup signal from the second UE based at least in part on the wakeup signal configuration.

Aspect 11: The method of aspect 10, further comprising: receiving the second wakeup signal from the second UE based at least in part on the monitoring; and monitoring for a sidelink transmission from the second UE based at least in part on receiving the second wakeup signal.

Aspect 12: The method of any of aspects 1 through 11, wherein identifying the indication of the wakeup signal configuration comprises: receiving the indication of the wakeup signal configuration from the second UE or from a base station.

Aspect 13: An apparatus for wireless communications at a first UE, comprising a processor; memory coupled with the processor; and instructions stored in the memory and executable by the processor to cause the apparatus to perform a method of any of aspects 1 through 12.

Aspect 14: An apparatus for wireless communications at a first UE, comprising at least one means for performing a method of any of aspects 1 through 12.

Aspect 15: A non-transitory computer-readable medium storing code for wireless communications at a first UE, the code comprising instructions executable by a processor to perform a method of any of aspects 1 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
    communicating an indication of a wakeup signal configuration for the first UE, the wakeup signal configuration indicating a wakeup signal monitoring occasion for sidelink wakeup signaling between the first UE and a second UE; and
    transmitting, in accordance with an identification of traffic for the second UE at the first UE, a wakeup signal to the second UE using a first set of resources for transmission of the wakeup signal by the first UE within the wakeup signal monitoring occasion, the first set of resources determined in accordance with the wakeup signal configuration and in accordance with a coordination rule between the first UE and the second UE, the first set of resources also disjoint in time with a second set of resources for the second UE within the wakeup signal monitoring occasion.

2. The method of claim 1, further comprising:
determining a joint index for the first UE and the second UE.

3. The method of claim 2, further comprising:
determining the first set of resources in accordance with the joint index; and
determining the second set of resources for the second UE in accordance with the joint index.

4. The method of claim 2, wherein the joint index is indicated in the wakeup signal configuration.

5. The method of claim 2, further comprising:
determining a number of time resources and a number of frequency resources of the wakeup signal monitoring occasion, wherein the first set of resources is determined in accordance with the number of time resources and the number of frequency resources of the wakeup signal monitoring occasion.

6. The method of claim 2, further comprising:
determining the first set of resources in accordance with an identifier of the first UE and the joint index for the first UE and the second UE.

7. The method of claim 2, further comprising:
determining a coordination rule between the first UE and the second UE, wherein the coordination rule indicates the first set of resources or the second set of resources based at least in part on a comparison of identifiers associated with the first UE and the second UE.

8. The method of claim 1, further comprising:
determining a hopping pattern for a sidelink control channel between the first UE and the second UE, wherein the first set of resources is determined in accordance with the hopping pattern.

9. The method of claim 1, wherein the wakeup signal monitoring occasion comprises two time-domain resource units, the method further comprising:
determining the first set of resources to be a first time-domain resource of the two time-domain resource units in accordance with an identifier of the first UE, the first time-domain resource corresponding to one of an odd time index value or an even time index value.

10. The method of claim 1, further comprising:
monitoring the second set of resources for a second wakeup signal from the second UE in accordance with the wakeup signal configuration.

11. The method of claim 10, further comprising:
receiving the second wakeup signal from the second UE in accordance with the monitoring; and
monitoring for a sidelink transmission from the second UE in accordance with receiving the second wakeup signal.

12. The method of claim 1, wherein identifying the indication of the wakeup signal configuration comprises:
receiving the indication of the wakeup signal configuration from the second UE or from a base station.

13. An apparatus for wireless communications at a first user equipment (UE), comprising:
a processor; and
memory coupled with the processor, the processor and memory operable to cause the apparatus to:
communicate an indication of a wakeup signal configuration for the first UE, the wakeup signal configuration indicating a wakeup signal monitoring occasion for sidelink wakeup signaling between the first UE and a second UE; and
transmit, in accordance with an identification of traffic for the second UE at the first UE, a wakeup signal to the second UE using a first set of resources for transmission of the wakeup signal by the first UE within the wakeup signal monitoring occasion, the first set of resources determined in accordance with the wakeup signal configuration and in accordance with a coordination rule between the first UE and the second UE, the first set of resources also disjoint in time with a second set of resources for the second UE within the wakeup signal monitoring occasion.

14. The apparatus of claim 13, wherein the processor and memory are further operable to cause the apparatus to:
determine a joint index for the first UE and the second UE.

15. The apparatus of claim 14, wherein the processor and memory are further operable by the processor to cause the apparatus to:
determine the first set of resources in accordance with the joint index; and
determine the second set of resources for the second UE in accordance with the joint index.

16. The apparatus of claim 14, wherein the joint index is indicated in the wakeup signal configuration.

17. The apparatus of claim 14, wherein the processor and memory are further operable to cause the apparatus to:
determine a number of time resources and a number of frequency resources of the wakeup signal monitoring occasion, wherein the first set of resources is determined in accordance with the number of time resources and the number of frequency resources of the wakeup signal monitoring occasion.

18. The apparatus of claim 14, wherein the processor and memory are further operable to cause the apparatus to:
determine the first set of resources in accordance with an identifier of the first UE and the joint index for the first UE and the second UE.

19. The apparatus of claim 14, wherein the processor and memory are further operable to cause the apparatus to:
determine a coordination rule between the first UE and the second UE, wherein the coordination rule indicates the first set of resources or the second set of resources in accordance with a comparison of identifiers associated with the first UE and the second UE.

20. The apparatus of claim 13, wherein the processor and memory are further operable to cause the apparatus to:
determine a hopping pattern for a sidelink control channel between the first UE and the second UE, wherein the first set of resources is determined in accordance with the hopping pattern.

21. The apparatus of claim 13, wherein the wakeup signal monitoring occasion comprises two time-domain resource units, and the processor and memory are further operable to cause the apparatus to:
determine the first set of resources to be a first time-domain resource of the two time-domain resource units in accordance with an identifier of the first UE, the first time-domain resource corresponding to one of an odd time index value or an even time index value.

22. The apparatus of claim 13, wherein the processor and memory are further operable to cause the apparatus to:
monitor the second set of resources for a second wakeup signal from the second UE in accordance with the wakeup signal configuration.

23. The apparatus of claim 22, wherein the processor and memory are further operable to cause the apparatus to:
receive the second wakeup signal from the second UE in accordance with the monitoring; and
monitor for a sidelink transmission from the second UE in accordance with receiving the second wakeup signal.

24. The apparatus of claim 13, wherein the processor and memory are further operable to cause the apparatus to:
receive the indication of the wakeup signal configuration from the second UE or from a base station.

25. An apparatus for wireless communications at a first user equipment (UE), comprising:
means for communicating an indication of a wakeup signal configuration for the first UE, the wakeup signal configuration indicating a wakeup signal monitoring occasion for sidelink wakeup signaling between the first UE and a second UE; and
means for transmitting, in accordance with an identification of traffic for the second UE at the first UE, a wakeup signal to the second UE using a first set of resources for transmission of the wakeup signal by the first UE within the wakeup signal monitoring occasion, the first set of resources determined in accordance with the wakeup signal configuration and in accordance with a coordination rule between the first UE and the second UE, the first set of resources also disjoint in time with a second set of resources for the second UE within the wakeup signal monitoring occasion.

26. The apparatus of claim 25, further comprising:
means for determining a joint index for the first UE and the second UE.

27. The apparatus of claim 26, further comprising:
means for determining the first set of resources in accordance with the joint index; and
means for determining the second set of resources for the second UE in accordance with the joint index.

28. A non-transitory computer-readable medium storing code for wireless communications at a first user equipment (UE), the code comprising instructions executable by a processor to:
communicate an indication of a wakeup signal configuration for the first UE, the wakeup signal configuration indicating a wakeup signal monitoring occasion for sidelink wakeup signaling between the first UE and a second UE; and
transmit, in accordance with an identification of traffic for the second UE at the first UE, a wakeup signal to the second UE using a first set of resources for transmission of the wakeup signal by the first UE within the wakeup signal monitoring occasion, the first set of resources determined in accordance with the wakeup signal configuration and in accordance with a coordination rule between the first UE and the second UE, the first set of resources also disjoint in time with a second set of resources for the second UE within the wakeup signal monitoring occasion.

29. The non-transitory computer-readable medium of claim 28, wherein the instructions are further executable by the processor to:
determine a joint index for the first UE and the second UE.

30. The non-transitory computer-readable medium of claim 29, wherein the instructions are further executable by the processor to:
determine the first set of resources in accordance with the joint index; and
determine the second set of resources for the second UE in accordance with the joint index.

* * * * *